United States Patent
Cao et al.

(10) Patent No.: US 12,328,439 B2
(45) Date of Patent: Jun. 10, 2025

(54) IMAGE PROCESSING METHOD AND APPARATUS, COMPUTER DEVICE, STORAGE MEDIUM AND PROGRAM PRODUCT FOR RECODING CURRENT FRAME BASED ON SCENE SWITCHING DETERMINATION

(71) Applicant: Tencent Technology (Shenzhen) Company Limited, Guangdong (CN)

(72) Inventors: Jian Cao, Shenzhen (CN); Hongbin Cao, Shenzhen (CN); Yongcheng Huang, Shenzhen (CN); Sijia Chen, Shenzhen (CN); Jia Zhang, Shenzhen (CN); Xiaoxiang Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 69 days.

(21) Appl. No.: 18/334,785

(22) Filed: Jun. 14, 2023

(65) Prior Publication Data

US 2023/0388526 A1 Nov. 30, 2023

Related U.S. Application Data

(63) Continuation of application No. PCT/CN2022/135663, filed on Nov. 30, 2022.

(30) Foreign Application Priority Data

Jan. 27, 2022 (CN) .......................... 202210101718.4

(51) Int. Cl.
*H04N 19/40* (2014.01)
*A63F 13/355* (2014.01)
(Continued)

(52) U.S. Cl.
CPC ........... *H04N 19/40* (2014.11); *A63F 13/355* (2014.09); *H04N 19/105* (2014.11);
(Continued)

(58) Field of Classification Search
CPC .... H04N 19/40; H04N 19/105; H04N 19/109; H04N 19/11; H04N 19/124;
(Continued)

(56) References Cited

U.S. PATENT DOCUMENTS

| 8,879,623 | B2 * | 11/2014 | Lee ....................... H04N 19/159 |
| | | | 375/240.03 |
| 2011/0051809 | A1 * | 3/2011 | Lee ....................... H04N 19/107 |
| | | | 375/E7.2 |

(Continued)

FOREIGN PATENT DOCUMENTS

| CN | 101677398 A | 3/2010 |
| CN | 108924611 A | 11/2018 |

(Continued)

OTHER PUBLICATIONS

International Search Report of PCT/CN2022/135663 dated Feb. 13, 2023 [PCT/ISA/210].

(Continued)

*Primary Examiner* — Susan E. Hodges
(74) *Attorney, Agent, or Firm* — Sughrue Mion, PLLC

(57) ABSTRACT

An image processing method and apparatus, a computer device, a storage medium and a program product, which can be applied to scenes such as image processing, game, and game basic skill. The method includes: encoding a current frame image to obtain an initial encoded image, and obtaining an encoding parameter, the encoding parameter comprising: a parameter indicating whether a scene switch exists in the current frame image; and recoding the current frame image based on a determination, according to the encoding
(Continued)

parameter, that the current frame image needs to be recoded to obtain a target encoded image, wherein a data volume of the target encoded image is less than the data volume of the initial encoded image.

20 Claims, 10 Drawing Sheets

(51) Int. Cl.
H04N 19/105 (2014.01)
H04N 19/109 (2014.01)
H04N 19/11 (2014.01)
H04N 19/124 (2014.01)
H04N 19/136 (2014.01)
H04N 19/142 (2014.01)
H04N 19/172 (2014.01)
H04N 19/182 (2014.01)
H04N 19/184 (2014.01)
H04N 19/463 (2014.01)

(52) U.S. Cl.
CPC ........... *H04N 19/109* (2014.11); *H04N 19/11* (2014.11); *H04N 19/124* (2014.11); *H04N 19/136* (2014.11); *H04N 19/142* (2014.11); *H04N 19/172* (2014.11); *H04N 19/182* (2014.11); *H04N 19/184* (2014.11); *H04N 19/463* (2014.11)

(58) Field of Classification Search
CPC .. H04N 19/136; H04N 19/142; H04N 19/172; H04N 19/182; H04N 19/184; H04N 19/463; H04N 19/14; H04N 19/146; H04N 19/70; A63F 13/355; A63F 13/323; A63F 13/77
USPC .......................................................... 375/240
See application file for complete search history.

(56) References Cited

U.S. PATENT DOCUMENTS

| 2021/0099713 A1* | 4/2021 | Cerny | H04N 19/107 |
| 2021/0185318 A1* | 6/2021 | Zhu | H04N 19/19 |
| 2022/0226736 A1* | 7/2022 | Hsiung | A63F 13/352 |

FOREIGN PATENT DOCUMENTS

| CN | 109561310 A | 4/2019 |
| CN | 110933430 A | 3/2020 |
| CN | 111698505 A | 9/2020 |

OTHER PUBLICATIONS

Written Opinion of PCT/CN2022/135663 dated Feb. 13, 2023 [PCT/ISA/237].

* cited by examiner

IMAGE PROCESSING METHOD AND APPARATUS, COMPUTER DEVICE, STORAGE MEDIUM AND PROGRAM PRODUCT FOR RECODING CURRENT FRAME BASED ON SCENE SWITCHING DETERMINATION

CROSS-REFERENCE TO RELATED APPLICATIONS

This application is a continuation application of International Application No. PCT/CN2022/135663, filed on Nov. 30, 2022, which claims priority to Chinese Patent Application No. 202210101718.4 filed with the China National Intellectual Property Administration on Jan. 27, 2022, the disclosures of each of which being incorporated by reference herein in their entireties.

FIELD

The disclosure relates to the field of computer technologies, and in particular, to an image processing method and apparatus, a computer device, a storage medium and a program product.

BACKGROUND

In the related art, a terminal receives, in real time, a bit stream (i.e., an encoded data flow) sent from a cloud. However, the content of different frames may vary greatly, resulting in large fluctuations in the data volume of bit streams of the different frames, which affects the smoothness of a bit rate.

SUMMARY

Embodiments of the disclosure provide an image processing method and apparatus, a computer device, a computer-readable storage medium and a computer program product.

Some embodiments provide an image processing method, the method including: encoding a current frame image to obtain an initial encoded image, and obtaining an encoding parameter, the encoding parameter comprising: a parameter indicating whether a scene switch exists in the current frame image; and recoding the current frame image based on a determination, according to the encoding parameter, that the current frame image needs to be recoded to obtain a target encoded image, wherein a data volume of the target encoded image is less than the data volume of the initial encoded image.

Some embodiments provide an image processing apparatus, including at least one memory configured to store program code; and at least one processor configured to read the program code and operate as instructed by the program code, the program code including: first encoding code configured to cause the at least one processor to encode a current frame image to obtain an initial encoded image, and obtain an encoding parameter, the encoding parameter comprises: a parameter for indicating whether a scene switch exists in the current frame image; and second encoding code configured to cause the at least one processor to recode the current frame image based on a determination, according to the encoding parameter, that the current frame image needs to be recoded to obtain a target encoded image, wherein a data volume of the target encoded image is less than the data volume of the initial encoded.

Some embodiments provide a computer-readable storage medium, the computer-readable storage medium storing a computer program, and the computer program being suitable for being loaded by a processor and executing the image processing method provided by some embodiments.

Some embodiments provide a computer device, including a processor and a memory, the memory storing a computer program, and the processor, by calling the computer program stored in the memory, performing the image processing method provided by some embodiments.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
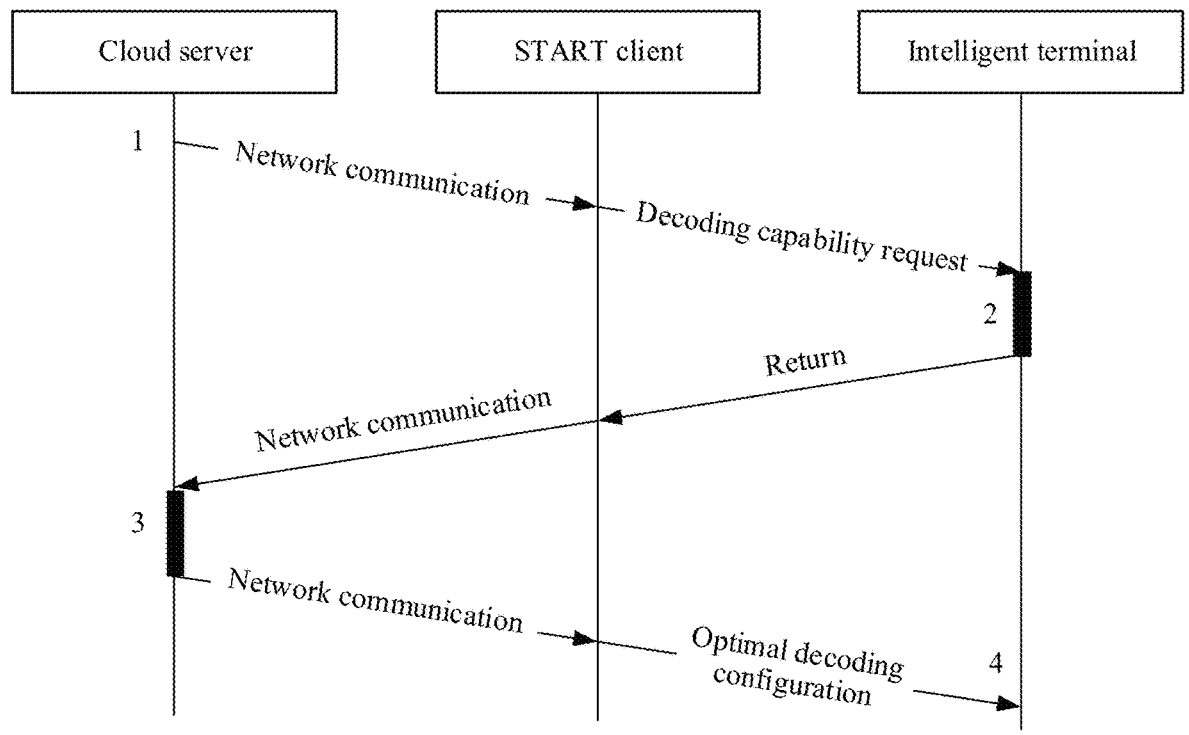
FIG. 1 is a schematic diagram of an application scene according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

The technical solutions provided in some embodiments may include the following beneficial effects:

In some embodiments, by determining, according to the encoding parameter of the current frame image, whether the current frame image needs to be recoded, and recoding the current frame image when the current frame image needs to be recoded, the data volume of the current frame image is reduced by means of recoding, frames having large data volume are effectively avoided, and the smoothness of a bit rate is maintained.

Some embodiments provide an image processing method and apparatus, a computer device, a computer-readable storage medium and a computer program product. In some embodiments, the image processing method may be performed by a computer device, which may be a terminal, a server or other devices. The terminal may be a smartphone, a tablet, a laptop, a desktop computer, a smart TV, a smart speaker, a wearable smart device, or smart on board terminal, etc. The terminal may further include a client, and the client may be a cloud gaming client, a client applet, a video client, a browser client or an instant messaging client, etc. The server may be an independent physical server, may also be a server cluster or a distributed system composed of multiple physical servers, and may further be a cloud server that provides basic cloud computing services such as cloud services, cloud databases, cloud computing, cloud functions, cloud storage, network services, cloud communication, middleware services, domain name services, security services, Content Delivery Networks (CDNs), and big data and artificial intelligence platforms.

Some embodiments may be applied to scenes as image processing, game, game basic technology, etc.

For example, when the method runs on a server, it can be cloud gaming. Cloud gaming refers to a game manner based on cloud computing. At a running mode of cloud gaming, a game application program running subject and a game picture presentation subject are separated, storage and running of the method are completed on a cloud gaming server. However, game picture presentation is completed on a cloud gaming client. The client is mainly used for receiving and sending game data, and presenting a game picture. For example, the cloud gaming client may be a display device having a data transmission function close to a user side, such as a mobile terminal, a TV, a computer, a palmtop computer, a personal digital assistant, etc., but a terminal device for game data processing is a cloud gaming server in the cloud. When playing a game, the user operates the cloud gaming client to send an operation instruction to the cloud gaming server, and the cloud gaming server runs the game according to the operation instruction, encodes and compresses the game picture and other data, and returns to the cloud gaming client via a network, and finally, the cloud gaming client decodes and outputs the game picture.

First, some nouns or terms appearing during description of embodiments are explained as follows:

A cloud technology refers to a hosting technology that integrates resources such as hardware, software and networks to implement data computing, storage, processing and sharing in a wide area network or local area network. The cloud technology is a general term of network technologies, information technologies, integration technologies, management platform technologies, application technologies and other technologies applied to a cloud computing business model, and creates a resource pool to satisfy what is needed in a flexible and convenient manner. Cloud computing technologies may be the backbone. A lot of computing resources and storage resources, such as video websites, picture websites and more portal websites, are needed for background services in a technical network system. With advanced development and application of the Internet industry, each object is likely to have a recognition flag. These flags need to be transmitted to a background system for logical processing, and data at different levels may be processed separately. Therefore, data processing in all industries requires a strong system to support, and is implemented only through cloud computing technologies.

Cloud gaming, which can also be referred to as gaming on demand, is an online game technology based on cloud computing technologies. The cloud gaming technology enables a thin client having a relatively limited graphics processing and data computing capability to run a high quality game. In a cloud gaming scene, the game is not run in a player game terminal, but in the cloud server, and the cloud server renders the game scene into a video and audio stream, which is transmitted to the player game terminal via the network. The player game terminal does not need to have a strong graphics computing and data processing capability, and only needs to have a basic streaming media playing capability and a capability of obtaining an input instruction of a player and sending the instruction to the cloud server.

Video encoding: a manner of converting, by means of a compression technology, a file in an original video format into a file in another video format, where converted data can be referred to as a bit stream.

Video decoding: a reverse process of video encoding.

IDR frame: Instantaneous decoding refresh frame (IDR), a type of encoded frames defined in video encoding technologies. The IDR frame only adopts intra prediction to encode, and a decoder can independently decode content of the IDR frame without information of other frames. The IDR frame is generally used as a reference frame of a subsequent frame, and also as a cut-in point of bit stream switching.

Intra prediction: predict a current pixel by using neighboring encoded pixels within a same frame image, without reference to an encoded image.

Inter prediction: predict a current pixel using neighboring encoded image pixels, with reference to the encoded image.

Quantization parameter: a parameter used in a quantization operation of video encoding. The greater the quantization, the higher the compression rate, but image quality decreases, and vice versa.

A cloud server refers to a server running a game in the cloud, and has functions such as video enhancement (encoding pre-processing), and video encoding.

A terminal refers to a class of devices that have rich human-computer interaction manners and ability to access the Internet, are usually loaded with various operating systems, and have strong processing capability. The terminal includes a smartphone, a living room TV, a tablet, an on board terminal, a handheld game console and etc.

In order to enable a cloud server and a terminal to perform better collaboration and realize joint optimization, in the process of cloud gaming, according to the hardware capability and real-time performance of the terminal, video encoding configuration is reasonably deployed, and video image processing, video content analysis and other computing tasks are reasonably deployed, so that the cloud gaming image quality experience is improved under limited cloud server resources.

Video encoding collaboration: select an encoding and decoding configuration and an encoding and decoding policy according to an encoding and decoding capability of the terminal, and in combination with game types and user network types.

Video rendering collaboration: a video rendering task is reasonably divided according to a graphics processing capability of the terminal, so that the cloud server and the terminal can effectively collaborate to improve the video image quality. The video rendering collaboration includes rendering area collaboration, rendering task collaboration, video analysis and processing collaboration, etc.

Terminal status collaboration: according to the real-time performance of terminal operation, an encoding collaboration task and a rendering collaboration policy of the cloud server and the terminal are dynamically adjusted to guarantee the user experience in real time.

The cloud server and the terminal collaboration architecture mainly include: a cloud server, a device-cloud collaboration policy, a device-cloud collaboration protocol, a terminal collaboration interface, a hardware and software collaboration module and other parts.

The device-cloud collaboration policy includes: a video encoding collaboration policy, a video rendering collaboration policy, and a terminal status collaboration policy. The cloud server generates a video encoding and rendering collaboration policy according to a device capability reported by a terminal and in combination with a game type and a user network environment. At the same time, the cloud server obtains the running performance of the terminal in real time through the terminal status collaboration, and dynamically adjusts the device-cloud collaboration policy.

A device-cloud collaboration protocol refers to a unified protocol that the cloud server and the terminal perform data interaction.

The terminal collaboration interface refers to a terminal software and hardware module interface, and through this interface, effective interaction with the terminal can be achieved, video encoding and rendering parameters are configured, and the real-time running performance of hardware is obtained.

A decoding protocol includes video encoding and decoding protocols such as H264, H265, and AV1, as well as Profile and Level supported by the terminal under each encoding and decoding protocol. The decoding performance refers to a maximum decoding frame rate and a single-frame decoding latency supported for a given video size under a specific decoding protocol.

The video size is defined as follows: 360p, 576p, 720p, 1080p, 2k, and 4k. A video frame rate is defined as follows: 30 fps, 40 fps, 50 fps, 60 fps, 90 fps, and 120 fps.

The decoding performance supported by the terminal is given in the form of a triplet. The first element is an enumeration definition of a video resolution, the second element is an enumeration definition of the video frame rate, and the third element is the single-frame decoding latency at the video resolution and the video frame rate, e.g. for H264 decoding of a device A, the single-frame decoding latency at 720 p@60 fps is 10 ms.

The cloud server determines a set of encoding functions that need to be enabled according to the game type and network conditions, and then determines an optimal encoding configuration of the current device through the device type and encoding capability reported by the terminal.

Terminal decoding capability data structure requirements are shown in Table 1:

TABLE 1 terminal decoding capability data structure requirements

| Section | Type | Section description |
|---|---|---|
| [codec_ability] | — | Video encoding and decoding capability |
| [codecN] | — | A video codec, N being a numerical value 1, 2, 3, . . . |

| Key | Type | Value description |
|---|---|---|
| codecs | Integer | Mandatory. The quantity of hardware codec types supported by the device. When the quantity of hardware codecs is N, then N Sections may immediately follow, i.e., [codec1], [codec2], . . . , [codecN], identifying information of the N codec types. |
| type | Enumeration | Encoding protocol type (an enumeration definition is shown as Table 1). 0: undefined; 16: H264; 17: H265; |
| profiles | Integer | The quantity of profiles supported by a decoder. When the quantity of profiles supported by the decoder is N, then N Keys may immediately follow, i.e. profile1, profile2, . . . , profileN, identifying content of the N profiles. |
| profileN | String (binary group) | N is numerical value 1, 2, 3, . . . Profile and level binary groups supported by the decoder are represented. The first element is profile (an enumeration definition is shown as Table 2), and the second element is level (an enumeration definition is shown as Table 3), separated by a comma. If only a H264 decoding protocol of the terminal device supports profile = High, level = Level51, it is represented as profileN = 8, 32768 |
| performances | Integer | Decoder performance indicator quantity When the quantity of performance indicators of the decoder is N, then N Keys immediately follow, i.e., performance1, performance2, . . . , performanceN, identifying content of the N performances. |
| performanceN | String (triplet) | N is numerical value 1, 2, 3, . . . Performance data triplets supported by the terminal are represented. The first element is a video size (see Table 4 for details), the second element is a video frame rate (see Table 5 for details), and the third element is a single-frame decoding latency in milliseconds. If the terminal device decoding 1080p@60fps may reach 5 ms, it is expressed as performanceX = 8, 8, 5. |

According to the decoding capability of the terminal, and in combination with the game type and network communication information, the cloud server determines a decoding protocol, a decoding resolution, a video frame rate and other encoding and decoding configurations of the current device, as well as a quantity of video encoding reference frames, SVC enabling and other encoding and decoding policies.

FIG. 1 shows a schematic diagram of a video rendering collaboration optimization connection process:

1. The cloud server initiates a capability obtaining request to the terminal (i.e., an intelligent terminal in FIG. 1) through a START client (i.e., a cloud gaming server).

Here, the cloud server communicates with the intelligent terminal through the START client, and based on the START client, sends to the terminal a capability obtaining request for requesting terminal decoding capability information. A request protocol field includes a protocol version number and an encoding and decoding protocol query.

2. Upon receipt of the capability obtaining request, the terminal returns a status label (success 0, failure is a worry code), a supported protocol version number, and terminal capability information.

In a case that the terminal only supports some decoding protocols, the terminal returns to supported decoding protocol information; in a case that the terminal does not support the decoding protocols, the terminal returns codecs=0; in a case that the terminal decoding capability information request fails, the terminal returns a corresponding worry code.

3. After receiving the terminal decoding capability information, in combination with the game type and network communication information, the cloud server determines an optimal decoding configuration of the current device.

The optimal decoding configuration of the current terminal includes: a decoding protocol, a decoding resolution, a video frame rate and other encoding and decoding configurations matching the terminal, as well as a quantity of video encoding reference frames, SVC enabling and other encoding and decoding policies.

4. After receiving the optimal decoding configuration, the terminal decodes a video stream based on the optimal decoding configuration.

The START client is a cloud gaming client, and the STAR client is installed on the terminal.

An example of the video encoding collaboration optimization connection protocol is as follows:

1. Video decoding capability request:

```
{
"codec_ability": {
"version": "1.0",
"type": "16,17"
}
}
```

2. Video decoding capability response (supporting all query decoding protocols):

```
{
"codec_ability": {
"state": "0"
"version": "1.0",
"codecs": "2"
},
"codec1": {
"type": "16",
"profiles": "3",
"profile1": "1,32768",
"profile2": "2,32768",
"profile3": "8,32768",
"performances": "3",
"performance1": "4,8,3",
"performance2": "8,8,6",
"performance3": "8,32,4"
},
"codec2": {
"type": "17",
"profiles": "1",
"profile1": "1,65536",
"performances": "3",
"performance1": "4,8,4",
"performance2": "8,8,8",
"performance3": "8,32,6"
}
}
```

3. Video decoding capability response (only supporting some query decoding protocols):

```
{
"codec_ability": {
"state": "0",
"version": "1.0",
"codecs": "1"
},
"codec1": {
"type": "16",
"profiles": "3",
"profile1": "1,32768",
"profile2": "2,32768",
"profile3": "8,32768",
"performances": "3",
"performance1": "4,8,3",
"performance2": "8,8,6",
"performance3": "8,32,4"
}
}
```

4. Video decoding capability request (not supporting the decoding protocols):

```
{
"codec_ability": {
"state": "0",
"version": "1.0",
"codecs": "0"
}
}
```

5. Video decoding capability request (protocol request fails):

```
{
"codec_ability": {
"state": "-1",
"version": "0.9"
}
}
```

In related arts, in order to greatly reduce time consumption, cloud gaming manufacturers mainly rely on hardware encoders for encoding and transmit to the terminal for playing. Though the hardware encoder has an extremely fast encoding speed, it usually inserts a frame having a great size when a scene switch occurs, resulting in a decrease in the smoothness of the transmission bit rate.

Some embodiments provide an image processing method that may determine, according to an encoding parameter, whether a current frame image needs to be recoded, for example, when a scene switch occurs, in response to a data volume of the current frame image becoming great, the current frame image may be determined to be recoded to reduce the data volume of the current frame image, so that frames with a great data volume are effectively avoided and the smoothness of a bit rate is maintained.

Figure 2:
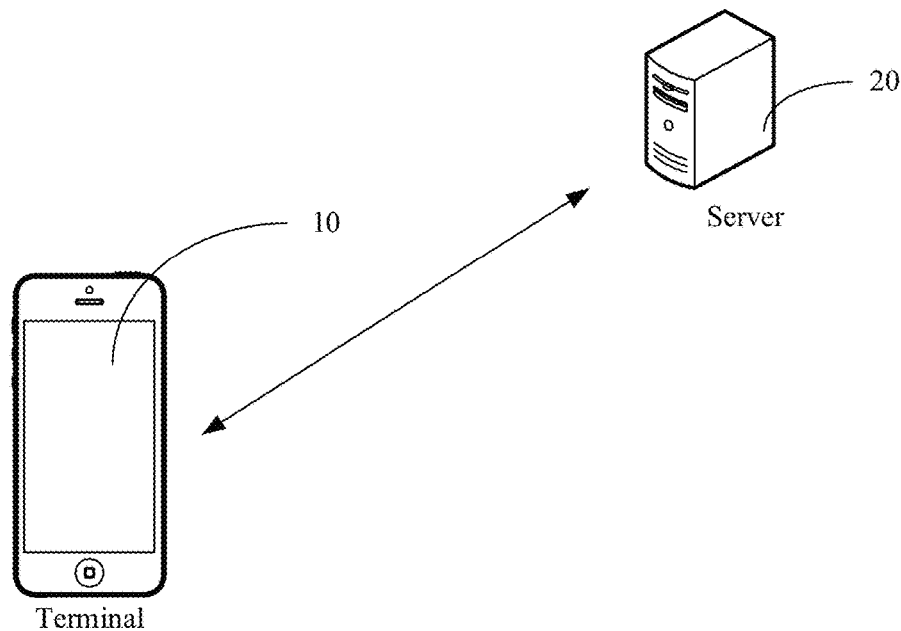
FIG. 2 is a schematic structural diagram of an image processing system according to some embodiments.

FIG. 2 is a schematic structural diagram of an image processing system according to some embodiments. The image processing system includes a terminal 10 and a server 20. The terminal 10 and the server 20 are connected to each other by using a network, for example a wired or wireless network.

The terminal 10 may be configured to display graphical user interface. The terminal is configured to interact with a user by means of a graphical user interface, for example, using the terminal 10 to download and install a client and run the client, or calling and running an applet, or logging into a website to present an image user interface, etc. In some embodiments, the terminal may be a terminal device used by the user for receiving a bit stream transmitted by the server 20 to display a game picture. The server 20 transmits an encoded bit stream to the terminal 10, and the terminal 10 receives and decodes the bit stream, and then plays a video or presents a game picture, etc. according to the decoded video data.

In some embodiments, during encoding, the server 20 may be configured to: encode a current frame image and obtain an encoding parameter; recode the current frame image in a case that it is determined according to the encoding parameter that the current frame image needs to be recoded, to reduce a data volume of the current frame image.

Detailed descriptions are separately provided below. The orders of the descriptions of the following embodiments are not limited thereto.

Some embodiments provide an image processing method, which may be executed by the terminal 10 or the server 20, or may be executed together by the terminal 10 and the server 20. In some embodiments, description is made by using an example in which the image processing method is executed the server 20.

Figure 3:
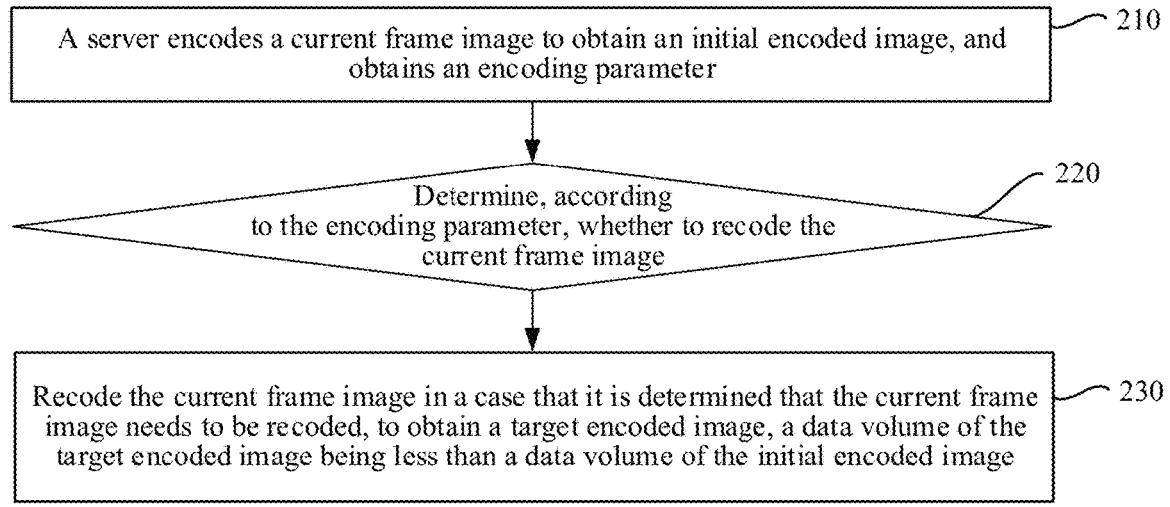
FIG. 3 is a schematic flowchart of an image processing method according to some embodiments.

Referring to FIG. 3, the image processing method includes:

Operation 210: a server encodes a current frame image to obtain an initial encoded image, and obtains an encoding parameter.

The server first encodes a frame image that needs to be encoded currently, i.e., the current frame image, and obtains the encoded parameter corresponding to the encoding. The encoding parameter includes: a parameter for indicating whether a scene switch exists in the current frame image.

The server 20 may obtain continuous multi-frame original images, and the original images refer to unencoded images, and then the server 20 may encode the original images. For the current encoded original image is the current frame image, so as to obtain the encoding parameter of the current frame image. The encoding parameter includes: a parameter for indicating whether a scene switch exists in the current frame image, and thus the server may determine, based on the encoding parameter, whether a scene switch exists in the current frame image.

In some embodiments, the encoding parameter further includes an image size which is used for indicating the size of a data volume of a bit stream after the current frame image is encoded. For example, the current frame image is encoded to obtain an initial encoded image, so that the image size included in the encoding parameter is used for indicating a data volume of the initial encoded image. The greater the image size is, the greater the data volume is after the current frame image is encoded.

In some embodiments, the encoding parameter may further include a ratio of an intra prediction pixel, and it is to be understood that the greater the ratio of the intra prediction pixel is, the greater the probability that a scene switch exists in the current frame image is. In some embodiments, a ratio threshold of the intra prediction pixel may be set in advance, and when the ratio of the intra prediction pixel in the encoding parameter reaches the ratio threshold, it is determined that the scene switch occurs in the current frame image.

Operation 220: Determine, according to the encoding parameter, whether to recode the current frame image.

After the encoding parameter of the current frame image is obtained, whether the current frame image needs to be recoded is determined according to the encoding parameter of the current frame image.

In some embodiments, to ensure the smoothness of a bit rate (i.e., a data volume used in a unit time), the bit rate required for transmission increases when the image size of the current frame image after encoding is great, affecting the smoothness of the bit rate.

Thus, the server 20 determines whether the image size of the current frame image after encoding is greater than the size threshold, and if the image size is greater than the size threshold, it indicates that recoding is required to reduce the image size, thereby reducing the data volume of the current frame image after encoding. The encoding parameter further includes a current encoding frame rate and a current encoding bit rate. The size threshold may be determined according to the current encoding frame rate and the current encoding bit rate, for example, size threshold=current encoding bit rate/current encoding frame rate, i.e., the size threshold is compared with an average data volume allocated to each frame, so as to determine, when the image size of the current frame image after encoding is greater than the size threshold, that the current frame image needs to be recoded, to reduce the data volume occupied by the current frame image and to ensure the smoothness of the bit rate.

In some embodiments, when the scene switch exists, the data volume of the current frame image after encoding is generally great, and therefore, when the scene switch exists, it may also be determined that the current frame image needs to be recoded.

The sever 20 may determine whether the ratio of the intra prediction pixel after the current frame image is encoded is greater than a preset ratio (i.e., a ratio threshold), for example, the preset ratio may be 70%, 80%, 85%, 89%, 95%, etc. When the ratio of the intra prediction pixel is greater than the preset ratio, it is determined that a scene switch exists in the current frame image, and the server 20 determines that the current frame image needs to be recoded, so as to reduce the data volume after encoding by recoding the current frame image.

Figure 4:
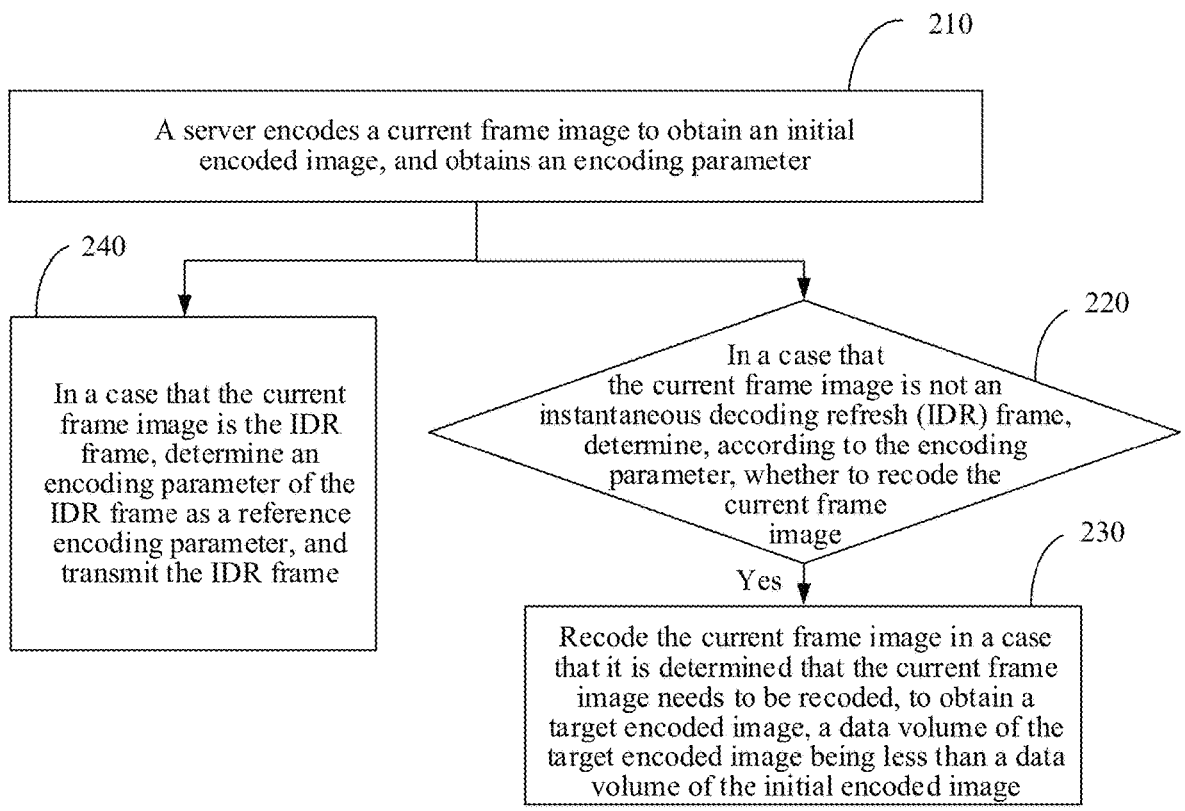
FIG. 4 is a schematic flowchart of an image processing method according to some embodiments.
Figure 5:
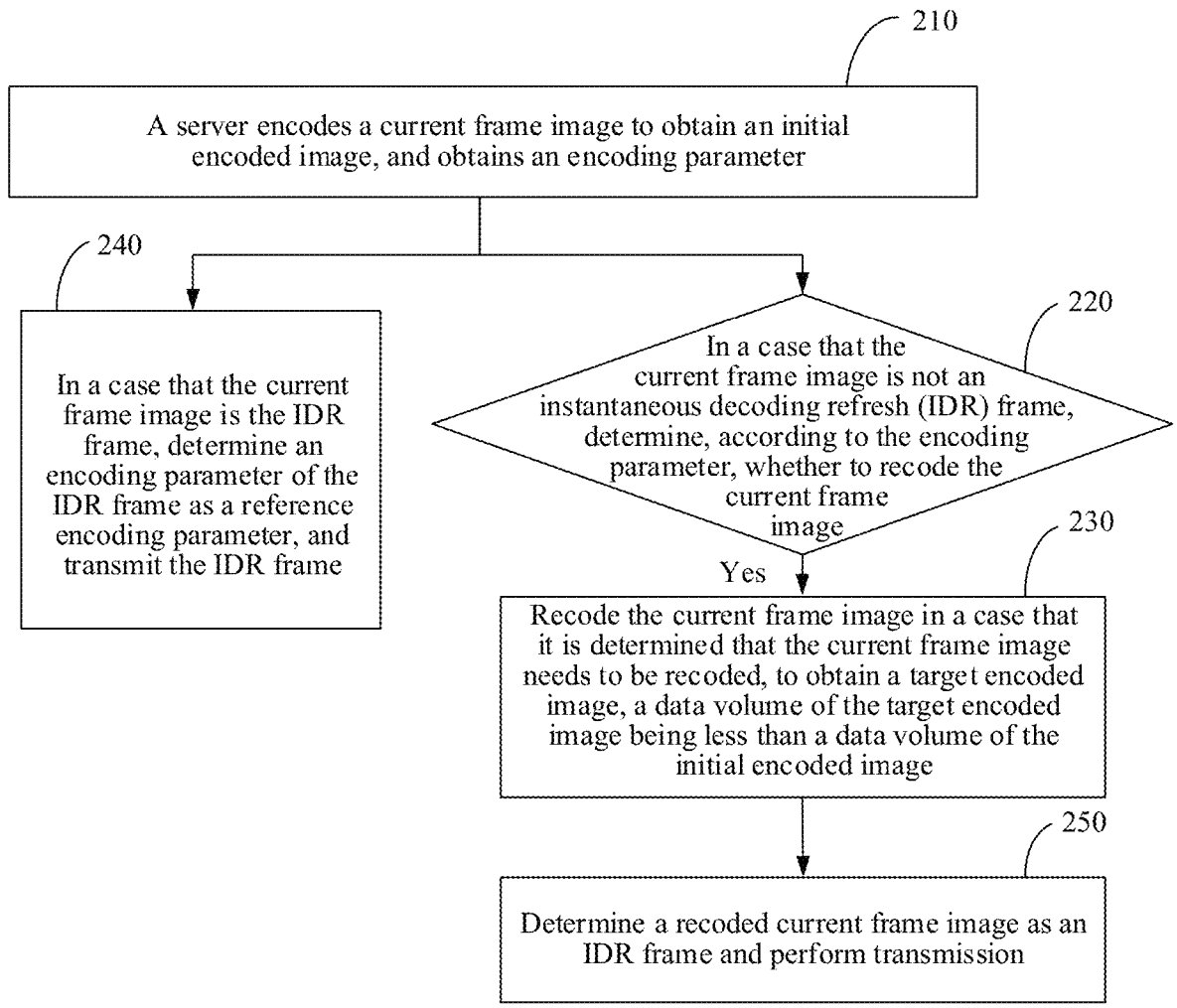
FIG. 5 is a schematic flowchart of an image processing method according to some embodiments.
Figure 6:
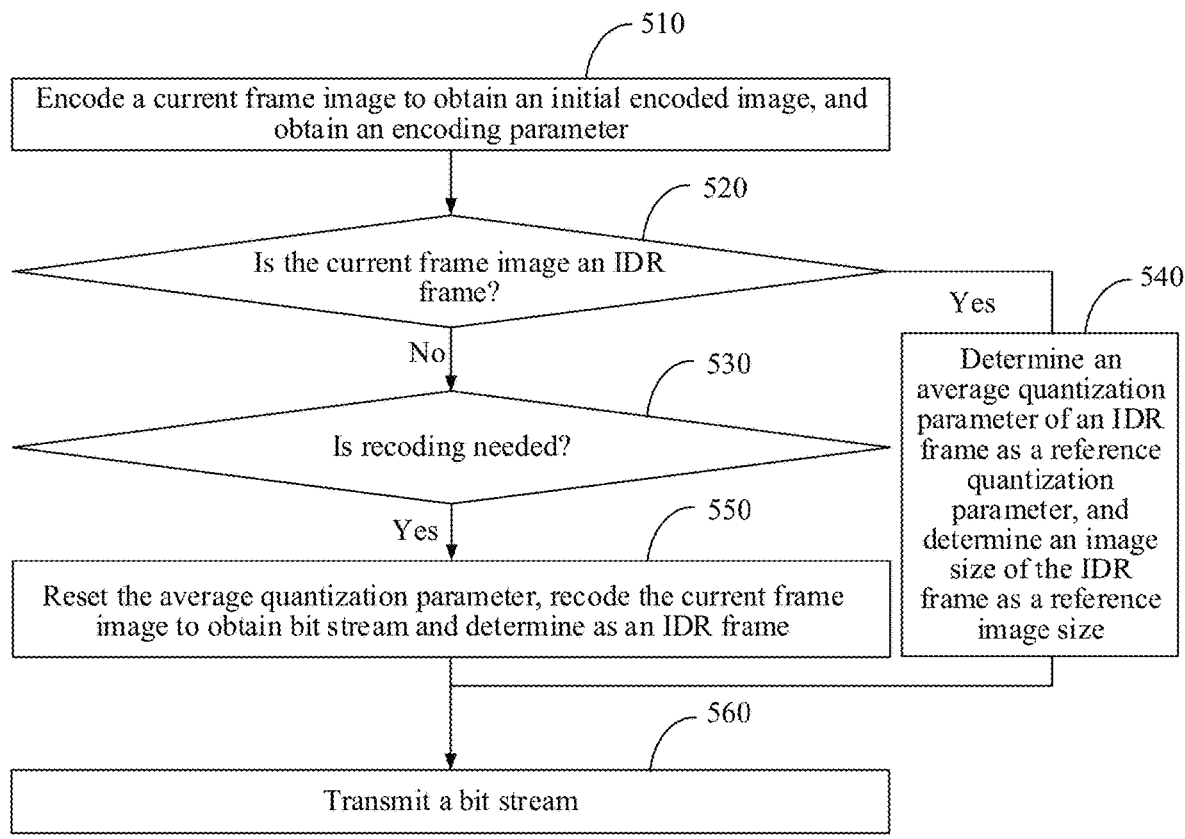
FIG. 6 is a schematic flowchart of an image processing method according to some embodiments.

In some embodiments, as shown in FIG. 4 and FIG. 5, after the current frame image is encoded, operation 220 may further include: when the current frame image is not an IDR frame, whether to recode the current frame image is determined according to the encoding parameter; when the current frame image is not an IDR frame, the current frame image may not be a reference image for a subsequent image, and recoding the current frame does not affect the encoding of the subsequent image. Therefore, when the current frame image is not an IDR frame, whether to recode the current frame image is determined according to the encoding parameter.

Operation 230: Recode the current frame image in a case that it is determined that the current frame image needs to be recoded, to obtain a target encoded image, a data volume of the target encoded image being less than a data volume of the initial encoded image.

After it is determined that the current frame image needs to be recoded, the server 20 may recode the current frame image to enable the data volume of the target encoded image obtained by recoding to be less than the data volume of the initial encoded image obtained by first encoding, so as to reduce a required data volume of the initial encoded image for transmitting the current frame image.

In some embodiments, the server 20 may recode the current frame image by a manner of adjusting an average quantization parameter in the encoding parameter. The greater the average quantization parameter is set, the less the data volume is after the current frame image is recoded, and therefore, in a case that the scene switch occurs in the current frame image, and the image size of the current frame image is great or the like, which may lead to a great data volume of the current frame image after encoding, the current frame image is recoded with a great average quantization parameter (for example, adding a predetermined value, greater than 0, to the average quantization parameter of the encoding parameter of the current frame image), so as to reduce the data volume of the current frame image after encoding and prevent fluctuations of the bit rate to ensure the smoothness of the bit rate. For a cloud gaming scene, the smoothness of the bit rate is beneficial to improving the game experience.

In some embodiments, as shown in FIG. 4, the image processing method further includes:

Operation 240: determine, in a case that the current frame image is an IDR frame, an encoding parameter of the IDR frame as a reference encoding parameter, and transmit the IDR frame.

The current frame image may be a first frame of a group of pictures (GOP) in the case that the current frame image is an IDR frame, and encoding information of the current frame image is used as reference information for subsequent determination of an IDR frame, no recoding is required. Therefore, when the current frame image is an IDR frame, even if an image size of the current frame image is great or a scene switch exists, the IDR frame is not be recoded, but the IDR frame is transmitted directly to ensure encoding efficiency.

In some embodiments, as shown in FIG. 5, the image processing method further includes:

Operation 250: Determine the recoded current frame image as an IDR frame and transmit the recoded current frame.

It is to be understood that recoding the current frame image indicates that a scene switch may exist in the current frame image and subsequent images may all be content within the scene after the switch. Therefore, taking the recoded current frame image (i.e., the target encoded image) as an IDR frame to serve as a reference frame for encoding of subsequent images may improve the encoding accuracy of subsequent images.

To better describe the image processing method provided by some embodiments, please refer FIG. 3 to FIG. 6 again. The process of the image processing method provided by some embodiments may be summarized as following operations:

Operation 510: Encode a current frame image to obtain an initial encoded image, and obtain an encoding parameter.

The encoding parameter at least includes: a parameter for indicating whether a scene switch exists in the current frame image.

Operation 520: Determine that whether the current frame image is an IDR frame.

Operation 530: When the current frame image is not an IDR frame, determine, according to the encoding parameter, whether to recode the current frame image.

Operation 540: When the current frame image is an IDR frame, determine an average quantization parameter of the IDR frame as a reference quantization parameter, and an image size of the IDR frame as a reference image size.

Operation 550: Reset the average quantization parameter, recode the current frame image to obtain a bit stream, and determine the current frame image as an IDR frame.

Operation 560: Transmit the bit stream.

Refer to the description of operation 210 for operation 510. Refer to the description of operation 220 and operation 240 for operation 520 and operation 530. Refer to the description of operation 230 and operation 250 for operation 540. Refer to the description of operation 240 for operation 550. Refer to the description of operation 240 and operation 250 for operation 560.

Figure 7:
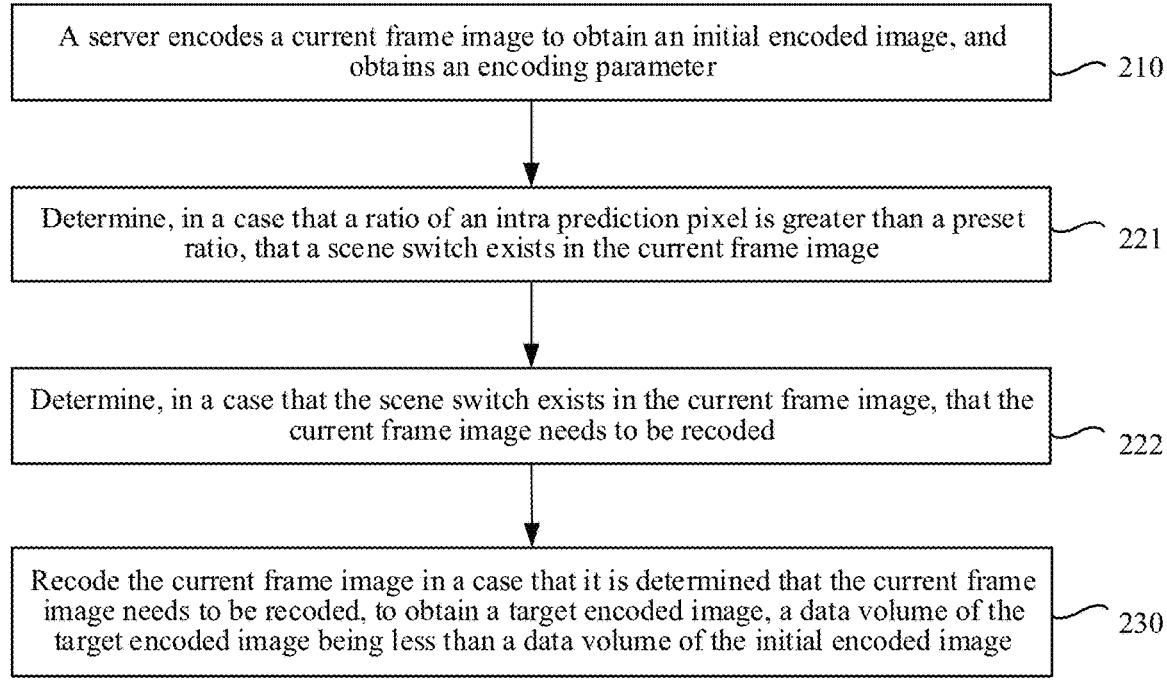
FIG. 7 is a schematic flowchart of an image processing method according to some embodiments.

As shown in FIG. 7, in some embodiments, operation 220 may be implemented by operation 221 to operation 222, including:

Operation 221: Determine, in a case that a ratio of an intra prediction pixel is greater than a preset ratio, that a scene switch exists in the current frame image.

In some embodiments, the encoding parameter includes the ratio of the intra prediction pixel. After the server 20 encodes the current frame image, the ratio of the intra prediction pixel within the current frame image may be obtained. Then, the server 20 compares the ratio of the intra prediction pixel with the preset ratio. If the ratio of the intra prediction pixel is greater than the preset ratio, it means that most of the pixels in the current frame image are obtained by intra prediction, most probably because the occurrence of the scene switch results in that a difference between the current frame image and a previous frame or a previous IDR frame is too great and accurate inter prediction cannot be achieved, and therefore, pixel filling needs to be implemented according to the intra prediction.

Therefore, when the ratio of the intra prediction pixel is greater than the preset ratio, the server 20 may determine that a scene switch exists in the current frame image, and when the ratio of the intra prediction pixel is less than or equal to the preset ratio, the server 20 may determine that no scene switch exists in the current frame image. Or, when the ratio of the intra prediction pixel is greater than or equal to the preset ratio, the server 20 can determine that a scene switch exists in the current frame image. Or, when the ratio of the intra prediction pixel is less than the preset ratio, the server 20 can determine that no scene switch exists in the current frame image.

Operation 222: Determine, in a case that the scene switch exists in the current frame image, that the current frame image needs to be recoded.

When a scene switch exists in the current frame image, the hardware encoder usually generates a frame with a large data volume of the current frame image after encoding, resulting in a decrease in the smoothness of the bit rate. Therefore, when it is determined that a scene switch exists in the current frame image, it is determined that the current frame image needs to be recoded, so as to reduce the data volume of the current frame image after encoding.

Figure 8:
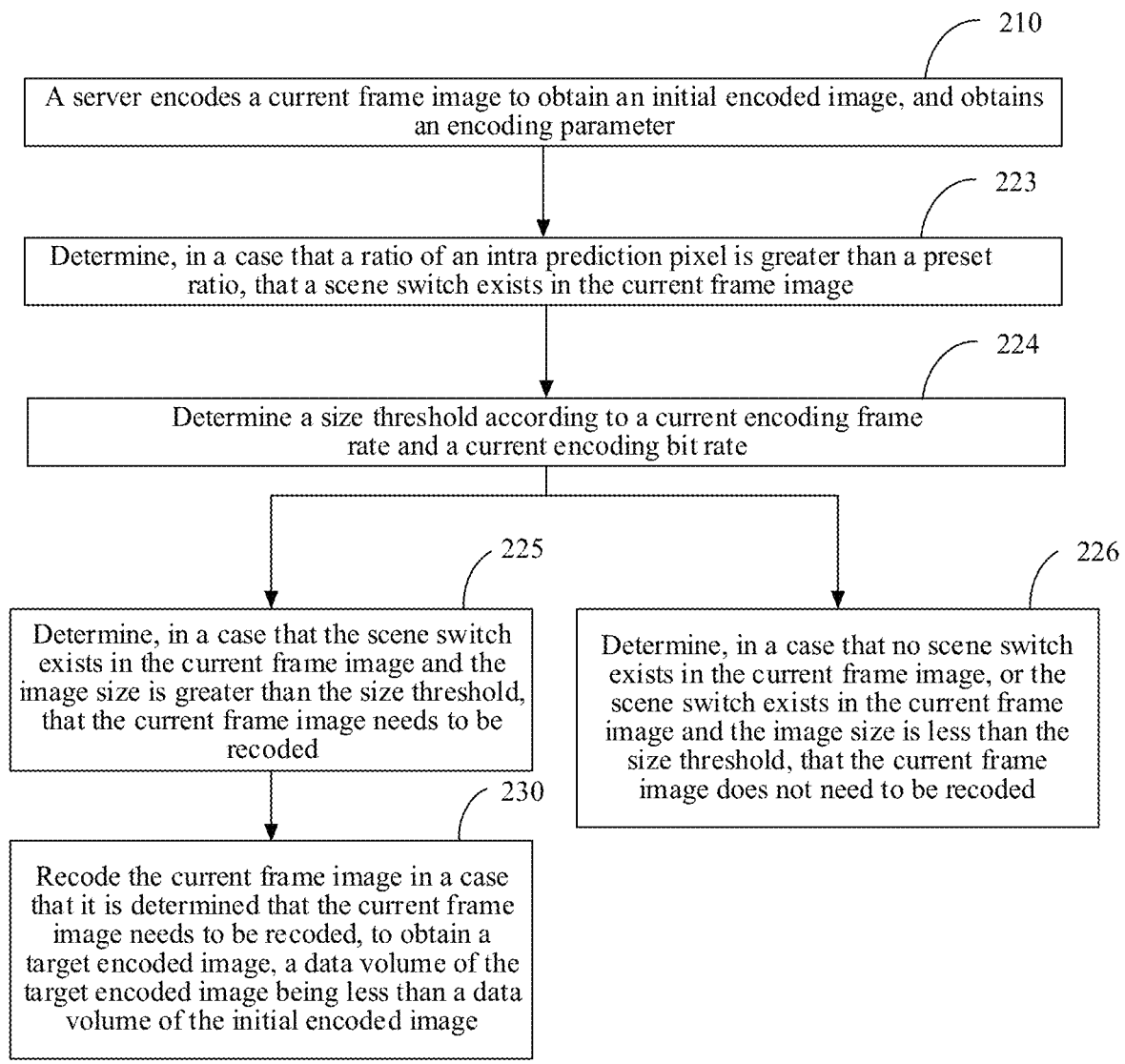
FIG. 8 is a schematic flowchart of an image processing method according to some embodiments.

In some embodiments, as shown in FIG. 8, operation 220 may be implemented by operation 223 to operation 226, including:

Operation 223: Determine, in a case that a ratio of an intra prediction pixel is greater than a preset ratio, that a scene switch exists in the current frame image.

The operation 223 is the same as operation 221, refer to the description of operation 221 for details. Details are not described herein again.

Operation 224: Determine a size threshold according to a current encoding frame rate and a current encoding bit rate.

When it is determined that a scene switch exists in the current frame image, whether the image size is too great after the current frame image is encoded further needs to be determined.

The encoding parameter further includes the ratio of the intra prediction pixel, the image size, the current encoding frame rate and the current encoding bit rate.

Through the current encoding frame rate and the current encoding bit rate, the server 20 may determine a size threshold corresponding to the current frame image, for example, size threshold=current frame image/current encoding frame rate.

Of course, the size threshold calculated by dividing the current encoding bit rate by the current encoding frame rate is basically the same as an average image size per frame, so that the size threshold can be expanded, for example, size threshold=1.5*current encoding bit rate/current encoding frame rate. It is determined that the image size of the current frame image after encoding is too great when the image size of the current frame image after encoding is greater than 1.5 times the average image size (i.e., current encoding bit rate/current encoding frame rate). Or, it is determined that the image size of the current frame image after encoding is too great when the image size of the current frame image after encoding is greater than or equal to 1.5 times the average image size. The size threshold can also be the average image size of other magnifications, such as 1.2 times, 1.3 times, and 1.4 times, which can be set according to a smoothness requirement of bit rate control.

In this way, by comparing the size threshold corresponding to the current frame image with the image size of the current frame image after encoding, whether the image size of the current frame image after encoding is too great is more accurately determined.

Operation 225: Determine, in a case that the scene switch exists in the current frame image and the image size is greater than the size threshold, that the current frame image needs to be recoded.

In a case that the scene switch exists in the current frame image and the image size is greater than (or, greater than or equal to) the size threshold, it means that a scene switch occurs in the current frame image and causes that the image size after encoding becomes too greater, and it may be determined that the current frame image needs to be recoded to reduce the data volume of the current frame image after encoding.

Operation 226: Determine, in a case that no scene switch exists in the current frame image, or the scene switch exists in the current frame image and the image size is less than the size threshold, that the current frame image does not need to be recoded.

When no scene switch exists in the current frame image, or a scene switch exists in the current frame image but the image size of the current frame image after encoding is less than (or, less than or equal to) the size threshold, it means that the data volume of the current frame image is not great and the smoothness of the bit rate may be ensured without recoding.

Figure 9:
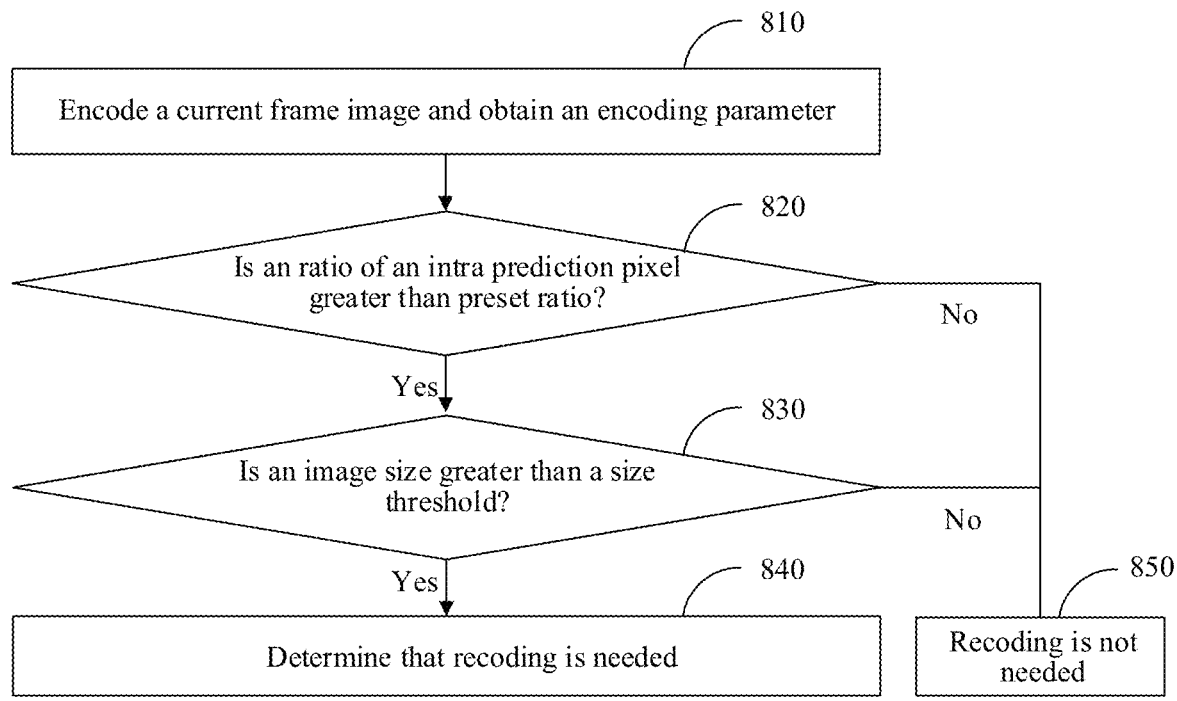
FIG. 9 is a schematic flowchart of an image processing method according to some embodiments.

To better describe the image processing method provided by some embodiments, please refer FIG. 7 to FIG. 9 again. The process of the image processing method provided by some embodiments may be summarized as following operations:

Operation 810: Encode a current frame image to obtain an encoding parameter.

Operation 820: Determine whether a ratio of an intra prediction pixel is greater than a preset ratio.

Operation 830: Determine whether an image size is greater than a size threshold.

Operation 840: Determine, when the ratio of the intra prediction pixel is greater than the preset ratio and the image size is greater than the size threshold, that recoding is required.

Operation 850: Recoding is not required when the ratio of the intra prediction pixel is less than the preset ratio, or, when the ratio of the intra prediction pixel is greater than the preset ratio and the image size of the current frame image is less than the size threshold.

Refer to the description of operation 210 for operation 810. Refer to the description of operation 223 for operation 820. Refer to the description of operation 224 and operation 225 for operation 830. Refer to the description of operation 225 for operation 840. Refer to the description of operation 226 for operation 850.

Figure 10:
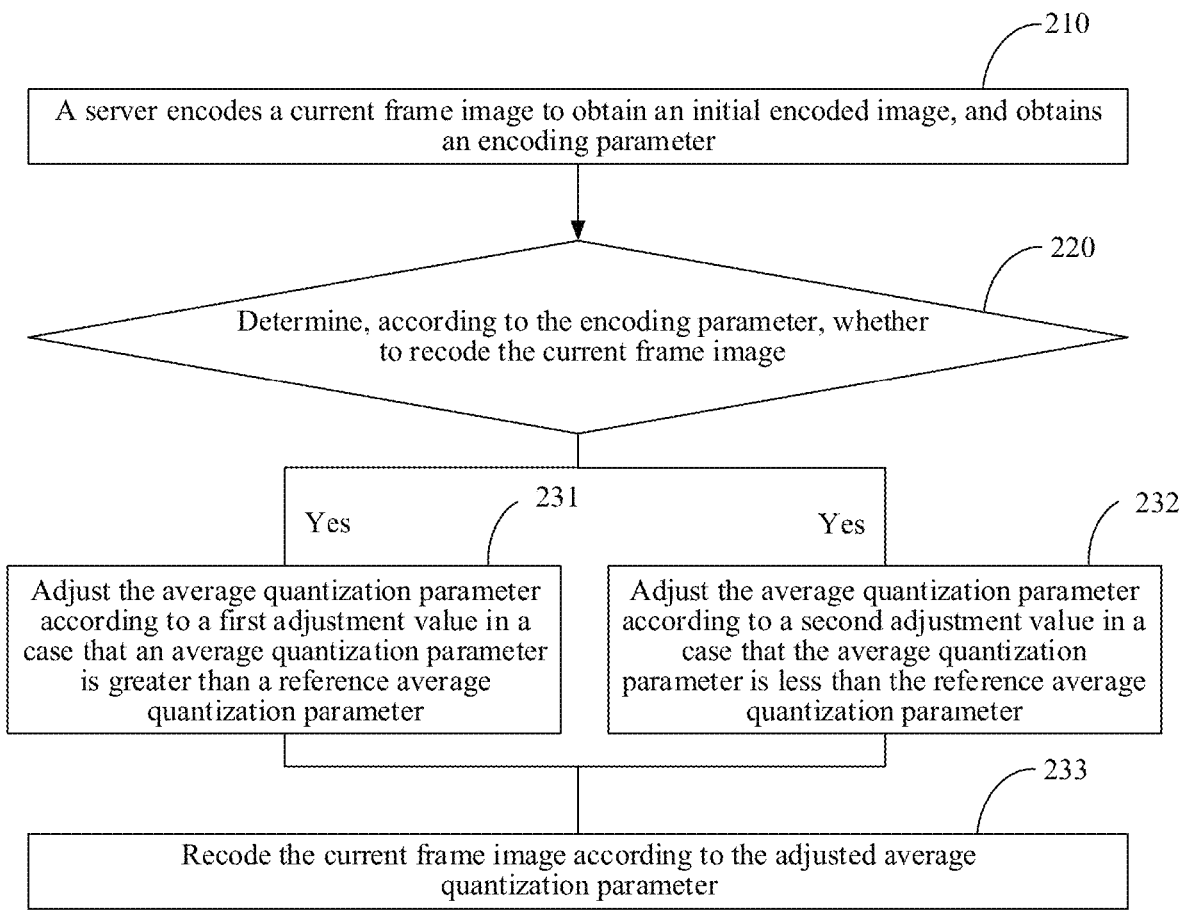
FIG. 10 is a schematic flowchart of an image processing method according to some embodiments.

In some embodiments, as shown in FIG. 10, operation 230 may be implemented by operation 231 to operation 233, including:

Operation 231: Adjust the average quantization parameter according to a first adjustment value in a case that an average quantization parameter is greater than a reference average quantization parameter.

The reference average quantization parameter is determined according to the average quantization parameter of an IDR frame before the current frame image.

For example, the encoding parameter further includes the average quantization parameter, and when the current frame image is recoded, whether the average quantization parameter of the current frame image after encoding is greater than (or, greater than or equal to) the reference average quantization parameter is first determined.

For example, if the average quantization parameter of the current frame image after encoding is greater than (or, greater than or equal to) the reference average quantization parameter, then the average quantization parameter of the current frame image after encoding may be adjusted according to the first adjustment value. After adjustment according to the first adjustment value, the average quantization parameter of the current frame image after encoding increases by the first adjustment value, such that a compression rate of encoding of the current frame image is higher and thus the data volume of the current frame image after encoding is reduced.

The reference average quantization parameter is determined according to an average quantization parameter of a decoded Instantaneous Decoding Refresh (IDR) frame before the current frame image. For example, the reference average quantization parameter is equal to the average quantization parameter of the previous IDR frame before the current frame image. The reference average quantization parameter is determined according to the average quantization parameter of the previous IDR frame before the current frame image, which may improve the accuracy of determining the reference average quantization parameter.

Because a larger average quantization parameter is used when the current frame image is encoded, in order to prevent the compression rate of the current frame image from being too great after recoding, resulting in distortion of the current frame image, in some embodiments, the first adjustment value can be set according to the actual needs, and the first adjustment value can be set smaller, for example, the first adjustment value may be 1, 2, etc.

Operation 232: Adjust the average quantization parameter according to a second adjustment value in a case that the average quantization parameter is less than the reference average quantization parameter, the second adjustment value being greater than the first adjustment value.

For example, if the average quantization parameter of the current frame image after encoding is less than (or, less than or equal to) the reference average quantization parameter, then the average quantization parameter of the current frame image after encoding may be adjusted according to the second adjustment value. After adjustment according to the second adjustment value, the average quantization parameter of the current frame image after encoding increases by the second adjustment value, such that a compression rate of the current frame image encoding is higher and the data volume of the current frame image after encoding is reduced.

Because a smaller average quantization parameter is used when the current frame image is encoded, in order to prevent the data volume of the current frame image from remaining great after recoding, in some embodiments, the second adjustment value may be set according to the actual needs, and the second adjustment value may be set greater, for example, the second adjustment value may be 3, 4, 5, etc., so as to ensure that the data volume of the current frame image after recoding is not too great, and to ensure the smoothness of the bit rate.

Operation 233: Recode the current frame image according to the adjusted average quantization parameter.

Finally, the server 20 recodes the current frame image according to the adjusted average quantization parameter, thus maximizing the data volume of the current frame image after recoding without distortion and ensuring the smoothness of the bit rate.

Figure 11:
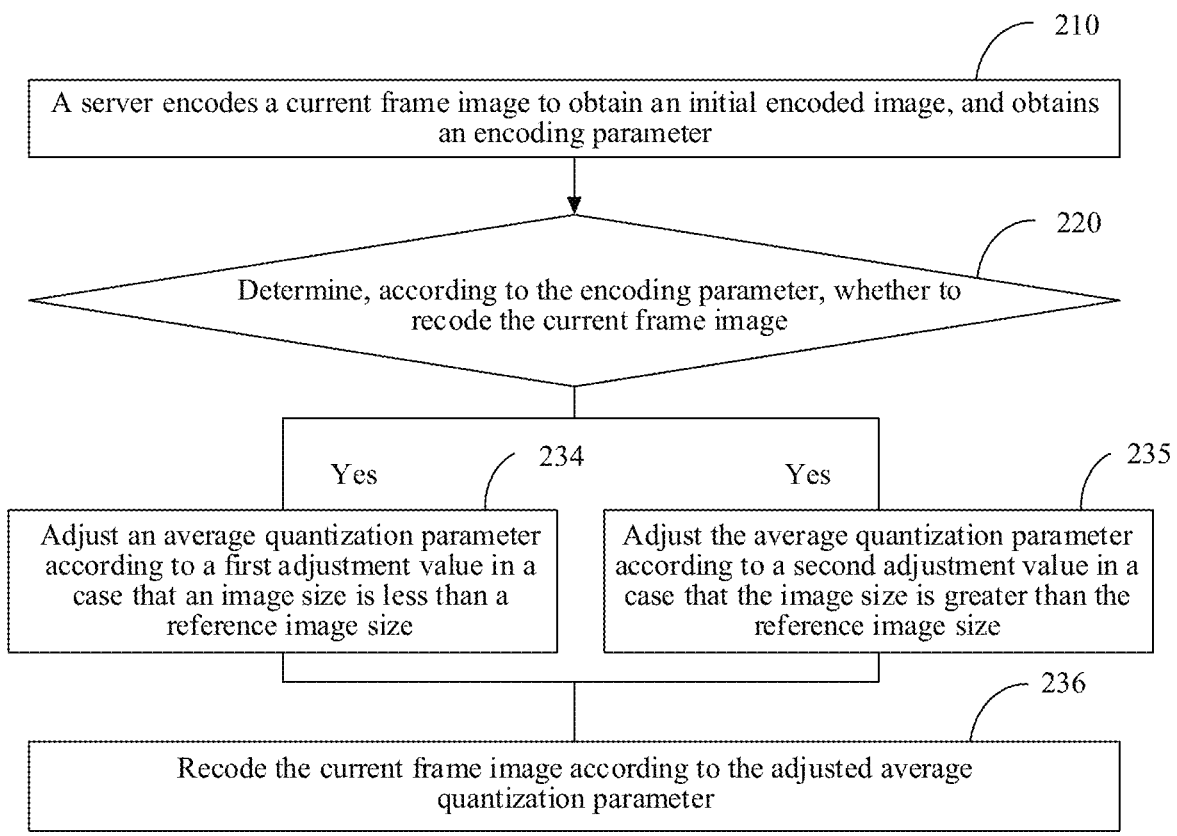
FIG. 11 is a schematic flowchart of an image processing method according to some embodiments.

In some embodiments, as shown in FIG. 11, operation 230 may further be implemented by operation 234 to operation 236, including:

Operation 234: Adjust the average quantization parameter according to the first adjustment value in a case that an image size is less than a reference image size.

The reference image size is determined according to the image size of the IDR frame before the current frame image.

For example, the encoding parameter further includes the image size, and when the current frame image is recoded, whether the image size of the current frame image after encoding is less than (or, less than or equal to) the reference image size.

For example, if the image size of the current frame image after encoding is less than (or, less than or equal to) the reference image size, then the average quantization parameter of the current frame image after encoding may be adjusted according to the first adjustment value. After adjustment according to the first adjustment value, the average quantization parameter of the current frame image after encoding increases by the first adjustment value, such that a compression rate of encoding of the current frame image is higher and thus the data volume of the current frame image after encoding is reduced.

The reference image size is determined according to the image size of an encoded IDR frame before the current frame image. For example, the reference image size is equal to the image size of the previous IDR frame before the current frame image. The reference image size is determined according to the image size of the previous IDR frame before the current frame image, which may improve the accuracy of determining the reference image size.

Because the image size of the current frame image after encoding is smaller, in order to prevent the compression rate of the current frame image from being too great after recoding, resulting in distortion of the current frame image, the first adjustment value may be set smaller, for example, the first adjustment value may be 1, 2, etc.

Operation 235: Adjust the average quantization parameter according to the second adjustment value in a case that the image size is greater than the reference image size, the second adjustment value being greater than the first adjustment value.

For example, if the image size of the current frame image after encoding is greater than (or, greater than or equal to) the reference image size, then the average quantization parameter of the current frame image after encoding may be adjusted according to the second adjustment value. After adjustment according to the second adjustment value, the average quantization parameter of the current frame image after encoding increases by the second adjustment value, such that a compression rate of the current frame image encoding is higher and the data volume of the current frame image after encoding is reduced.

Because the image size of the current frame image after encoding is higher, in order to prevent the data volume of the current frame image from remaining great after recoding, the second adjustment value may be set greater, for example, the second adjustment value may be 3, 4, 5, etc., so as to ensure that the data volume of the current frame image after recoding is not too great, and to ensure the smoothness of the bit rate.

Operation 236: Recode the current frame image according to the adjusted average quantization parameter.

Finally, the server 20 recodes the current frame image according to the adjusted average quantization parameter, thus maximizing the data volume after recoding the current frame image without distortion and ensuring the smoothness of the bit rate.

Figure 12:
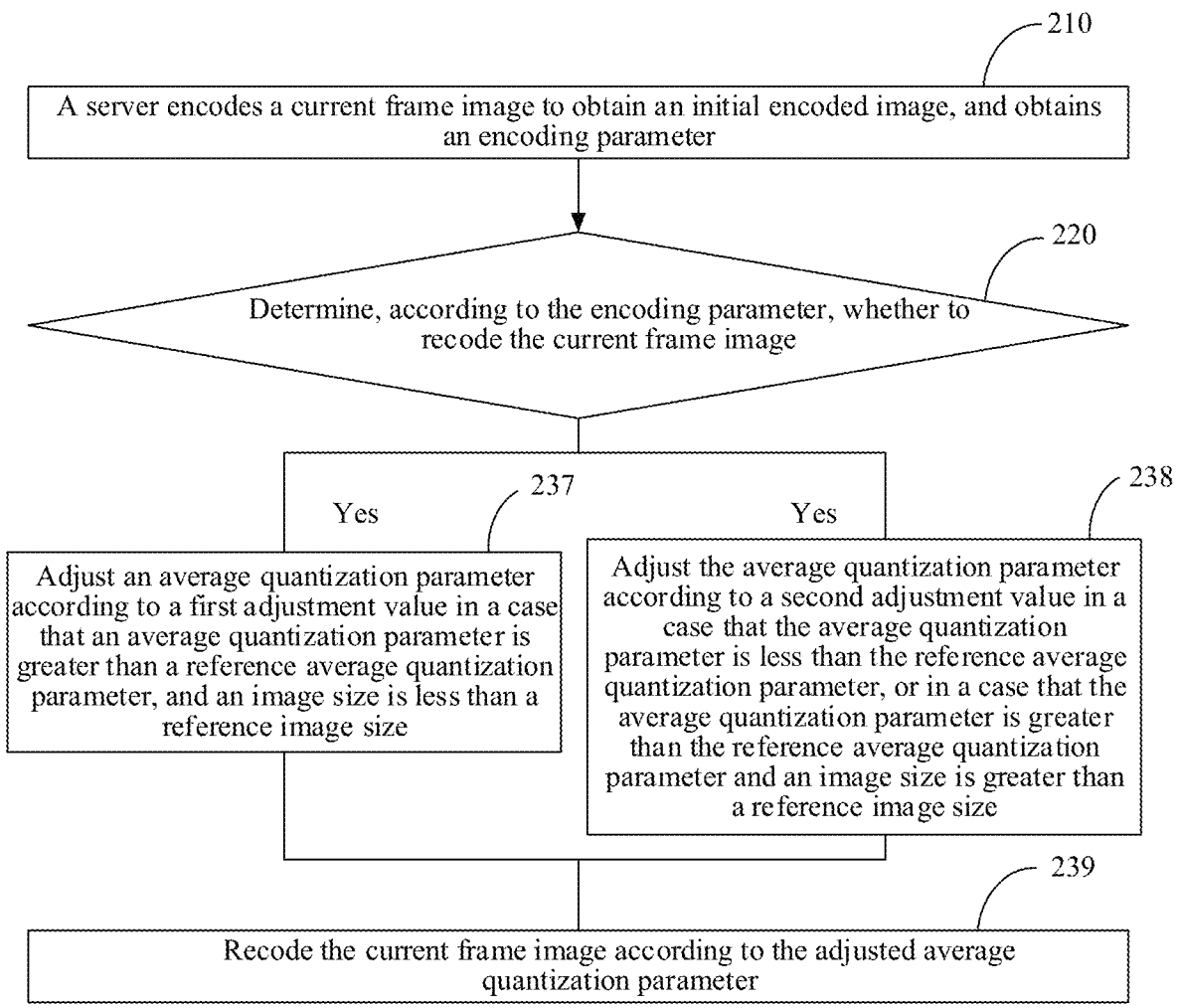
FIG. 12 is a schematic flowchart of an image processing method according to some embodiments.

In some embodiments, as shown in FIG. 12, operation 230 may further be implemented by operation 237 to operation 239, including:

Operation 237: Adjust the average quantization parameter according to the first adjustment value in a case that the average quantization parameter is greater than the reference average quantization parameter and the image size is less than the reference image size.

The reference average quantization parameter is determined according to the average quantization parameter of an IDR frame before the current frame image, and the reference image size is determined according to the image size of the IDR frame before the current frame image.

When the current frame image is recoded, whether the average quantization parameter of the current frame image after encoding is greater than (or, greater than or equal to) the reference average quantization parameter, and whether the image size of the current frame image after encoding is less than (or, less than or equal to) the reference image size are first determined.

In a case that the average quantization parameter of the current frame image after encoding is greater than (or, greater than or equal to) the reference average quantization parameter and the image size of the current frame image after encoding is less than (or, less than or equal to) the reference image size, then the average quantization parameter of the current frame image after encoding may be adjusted according to the first adjustment value. After adjustment according to the first adjustment value, the average quantization parameter of the current frame image after encoding increases by the first adjustment value, such that a compression rate of encoding of the current frame image is higher and thus the data volume of the current frame image after encoding is reduced.

For the determination of the reference average quantization parameter and the reference image size, please refer to the description of operation 231 and operation 234 respectively. Details are not described herein again.

Because a greater average quantization parameter used in the encoding of the current frame image and the image size of the current frame image is smaller, in order to prevent the compression rate of the current frame image from being too great after recoding, resulting in distortion of the current frame image, the first adjustment value may be set smaller, for example, the first adjustment value may be 1, 2, etc.

Operation 238: Adjust the average quantization parameter according to the second adjustment value in a case that the average quantization parameter is less than the reference average quantization parameter, or in a case that the average quantization parameter is greater than the reference average quantization parameter and the image size is greater than the reference image size.

The second adjustment value is greater than the first adjustment value.

For example, in a case that the average quantization parameter of the current frame image after encoding is less than (or, less than or equal to) the reference average quantization parameter, or in a case that the average quantization parameter after encoding the current frame is greater than (or, greater than or equal to) the reference average quantization parameter and the image size of the current frame image after encoding is greater than (or, greater than or equal to) the reference image size, then the average quantization parameter of the current frame image after encoding may be adjusted according to the second adjustment value. After adjustment according to the second adjustment value, the average quantization parameter of the current frame image after encoding increases by the second adjustment value, such that a compression rate of the current frame image encoding is higher and the data volume of the current frame image after encoding is reduced.

Because a smaller average quantization parameter used in the encoding of the current frame image, or the current frame image is encoded with a greater average quantization parameter but the image size of the current frame image after encoding is still great, in order to prevent the data volume of the current frame image from remaining great after recoding, the second adjustment value may be set greater, for example, the second adjustment value may be 3, 4, 5, etc., so as to ensure that the data volume of the current frame image after recoding is not too great, and to ensure the smoothness of the bit rate.

Operation 239: Recode the current frame image according to the adjusted average quantization parameter.

Finally, the server 20 recodes the current frame image according to the adjusted average quantization parameter, thus maximizing the data volume of the current frame image after recoding without distortion and ensuring the smoothness of the bit rate.

In some embodiments, the method further includes:
sending, through a cloud gaming client, a capability obtaining request to a terminal, the capability obtaining request being used for requesting encoding and decoding capability information of the terminal;
receiving the encoding and decoding capability information sent by the terminal, the encoding and decoding capability information being used for indicating an encoding capability and decoding capability of the terminal;
determining a target encoding and decoding configuration and a target encoding and decoding policy according to the encoding and decoding capability information, a type of a game run by the terminal and network communication information; and
encoding the current frame image, including:
encoding the current frame image according to the target encoding and decoding configuration and the target encoding and decoding policy, to obtain an encoding parameter.

For example, in combination with the schematic flowchart shown in FIG. 1, a cloud (cloud server) initiates, to the terminal (intelligent terminal) through the cloud gaming client (e.g. START client), a capability obtaining request for obtaining encoding and decoding capability information, to obtain the encoding and decoding capability information of the terminal.

A request protocol field can include information such as a protocol version number and an encoding and decoding protocol query. When receiving the capability obtaining request, the terminal uploads the encoding and decoding capability information to the cloud gaming client, and returns, through the cloud gaming client, the encoding and decoding capability information of the terminal to the cloud. The encoding and decoding capability information may include a status label, a supported protocol version number, and terminal device capability information. The terminal device capability information may include terminal encoding capability information and terminal decoding capability information.

The capability obtaining request may include at least one of a decoding capability request and an encoding capability request. After receiving the encoding and decoding capability information, the cloud may determine a target encoding and decoding configuration and a target encoding and decoding policy according to the encoding and decoding capability information, the game type and the network communication information. The target encoding and decoding configuration can include an optimal coding configuration and an optimal decoding configuration. The optimal decoding configuration can include an optimal decoding protocol, decoding resolution, video frame rate, etc. of the current terminal device. The target encoding and decoding policy may include the quantity of video coding reference frames, SVC enable, etc.

The cloud may determine a set of encoding functions that need to be enabled according to the game type and network condition, and then determines the optimal encoding configuration of the current device through the device type and encoding capability information reported by the terminal. According to the decoding capability information of the terminal, and in combination with the game type and network communication information, the cloud determines an optimal decoding protocol, a decoding resolution, a video frame rate and other decoding configurations of the current terminal, as well as a quantity of video encoding reference frames, SVC enabling and other encoding and decoding policies.

The cloud encodes the current frame image according to the target encoding and decoding configuration (may be the optimal encoding configuration) and the target encoding and decoding policy to obtain an encoding parameter.

Figure 13:
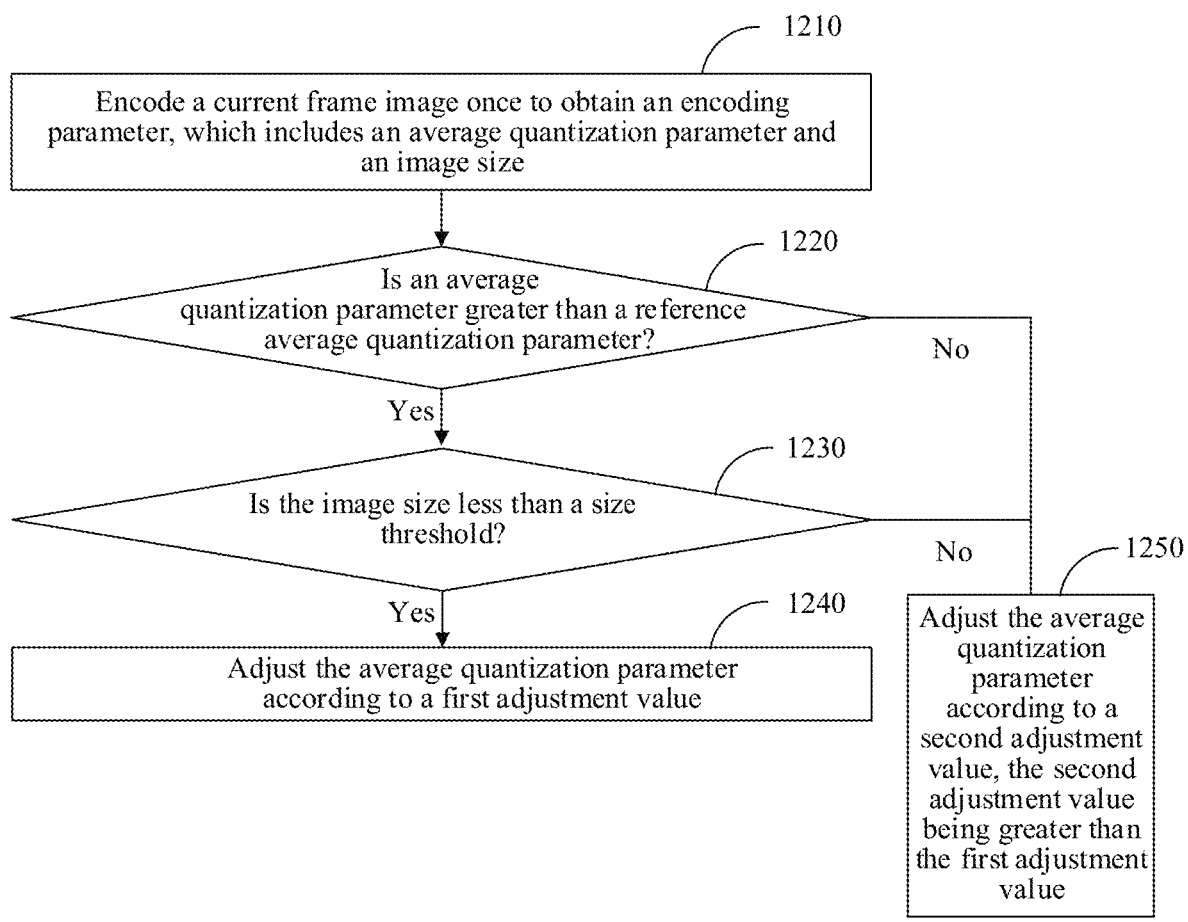
FIG. 13 is a schematic flowchart of an image processing method according to some embodiments.

To better describe the image processing method provided by some embodiments, refer to FIG. 13. The process of the image processing method provided by some embodiments may be summarized as following operations:

Operation 1210: Encode a current frame image to obtain an encoding parameter.

Operation 1220: Determine whether the average quantization parameter is greater than the reference average quantization parameter.

Operation 1230: Determine whether the image size is greater than the size threshold.

Operation 1240: Adjust the average quantization parameter according to the first adjustment value in a case that the average quantization parameter is greater than the reference average quantization parameter and the image size is less than the reference image size.

Operation 1250: Adjust the average quantization parameter according to the second adjustment value in a case that the average quantization parameter is less than the reference average quantization parameter, or in a case that the average quantization parameter is greater than the reference average quantization parameter and the image size is greater than the reference image size.

Refer to the description of operation 210 for operation 1210. Refer to the description of operation 237 and operation 238 for operation 1220 and operation 1230. Refer to the description of operation 237 for operation 1240. Refer to the description of operation 238 for operation 1250.

To better describe the image processing method provided by some embodiments, please refer FIG. 3 to FIG. 13 again. The process of the image processing method provided by some embodiments may be summarized as following operations:

Operation 210: Encode a current frame image to obtain an initial encoded image, and obtain an encoding parameter.

Operation 220: Determine, according to the encoding parameter, whether to recode the current frame image.

Operation 220 may be implemented by means of operation 221 and operation 222.

Operation 220 may be implemented by means of operation 223 to operation 226.

Operation 230: Recode the current frame image in a case that it is determined that the current frame image needs to be recoded, to obtain a target encoded image, a data volume of the target encoded image being less than a data volume of the initial encoded image.

Operation 220 may be implemented by means of operation 231 to operation 223, or by means of operation 234 to operation 226, or by means operation 237 to operation 229.

In some embodiments, by determining, according to the encoding parameter of the current frame image, whether the current frame image needs to be recoded, and recoding the current frame image when the current frame image needs to be recoded, the data volume of the current frame image is reduced by means of recoding, frames having large data volume are effectively avoided, and the smoothness of a bit rate is maintained.

In addition, in some embodiments, whether recoding is needed is determined more accurately by coordination of determination of a scene switch and an image size coordination, and an adjustment range of the average quantization parameter of the current frame image is determined by the average quantization parameter of the current frame image and the image size, so that the data volume of the current frame image after recoding is reduced to the maximum extent and the smoothness of the bit rate is ensured while it is ensured that the current frame image after recoding is not distorted.

Figure 14:
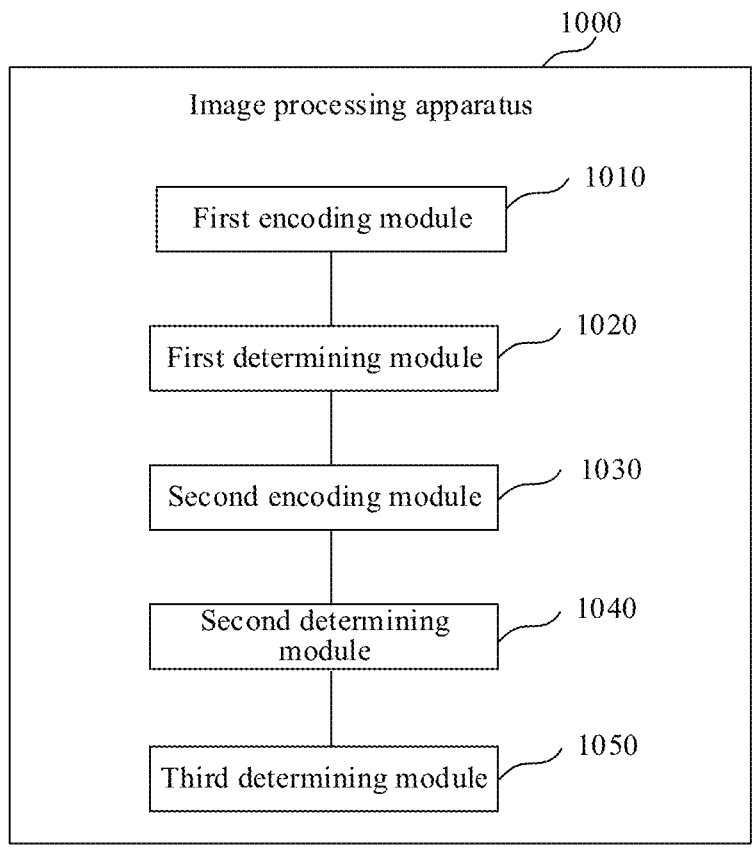
FIG. 14 is a schematic structural diagram of an image processing apparatus according to some embodiments.

Some embodiments further provide an image processing apparatus. FIG. 14 is a schematic structural diagram of an image processing apparatus according to some embodiments. An image processing apparatus 1000 may include:

a first encoding module 1010, configured to encode a current frame image to obtain an initial encoded image, and obtain an encoding parameter, the encoding parameter including: a parameter for indicating whether a scene switch exists in the current frame image; and a second encoding module 1030, configured to recode the current frame image in a case that it is determined according to the encoding parameter that the current frame image needs to be recoded, to obtain a target encoded image.

A data volume of the target encoded image is less than a data volume of the initial encoded image.

In some embodiments, the apparatus further includes: a first determining module 1020, configured to determine, according to the encoding parameter, whether the current frame image needs to be recoded.

In some embodiments, the first determining module 1020 is further configured to:
  determine, in a case that a ratio of an intra prediction pixel is greater than a preset ratio, that a scene switch exists in the current frame image; and
  determine, in a case that the scene switch exists in the current frame image, that the current frame image needs to be recoded.

In some embodiments, the first determining module 1020 is further configured to:
  determine, in a case that a ratio of an intra prediction pixel is greater than a preset ratio, that a scene switch exists in the current frame image;
  determine a size threshold according to a current encoding frame rate and a current encoding bit rate;
  determine, in a case that the scene switch exists in the current frame image and the image size is greater than the size threshold, that the current frame image needs to be recoded; and
  determine, in a case that no scene switch exists in the current frame image, or the scene switch exists in the current frame image and the image size is less than the size threshold, that the current frame image does not need to be recoded.

In some embodiments, the second encoding module 1030 is further configured to:
  adjust the average quantization parameter according to a first adjustment value in a case that an average quantization parameter is greater than a reference average quantization parameter, the reference average quantization parameter being determined according to an average quantization parameter of an IDR frame before the current frame image;
  adjust the average quantization parameter according to a second adjustment value in a case that the average quantization parameter is less than the reference average quantization parameter, the second adjustment value being greater than the first adjustment value; and recode the current frame image according to the adjusted average quantization parameter.

In some embodiments, the second encoding module 1030 is further configured to:

adjust the average quantization parameter according to the first adjustment value in a case that the image size is less than the reference image size, the reference image size being determined according to an image size of an IDR frame before the current frame image;

adjust the average quantization parameter according to the second adjustment value in a case that the image size is greater than the reference image size, the second adjustment value being greater than the first adjustment value; and recode the current frame image according to the adjusted average quantization parameter.

In some embodiments, the second encoding module 1030 is further configured to:

adjust the average quantization parameter according to the first adjustment value in a case that the average quantization parameter is greater than the reference average quantization parameter and the image size is less than the reference image size, the reference average quantization parameter being determined according to the average quantization parameter of the IDR frame before the current frame image, and the reference image size being determined according to the image size of the IDR frame before the current frame image;

adjust the average quantization parameter according to the second adjustment value in a case that the average quantization parameter is less than the reference average quantization parameter, or in a case that the average quantization parameter is greater than the reference average quantization parameter and the image size is greater than the reference image size, the second adjustment value being greater than the first adjustment value; and recode the current frame image according to the adjusted average quantization parameter.

In some embodiments, the image processing apparatus 1000 may further include the second determining module 1040, which is configured to determine, in a case that the current frame image is an IDR frame, an encoding parameter of the IDR frame as a reference encoding parameter and transmit the IDR frame.

In some embodiments, the image processing apparatus 1000 may further include a third determining module 1050, which is configured to determine a recoded current frame image as an IDR frame and transmit same.

Each module in the above image processing apparatus may be implemented entirely or partially through software, hardware, or a combination thereof. Each of the above modules may be embedded in a hardware form in or independent of the processor in the computer device, or may be stored in a software form in the memory in the computer device, so that the processor may be called to perform operations corresponding to each of the above modules.

The image processing apparatus 1000 may be integrated in the terminal 10 or the server 20 that has a memory and in which a processor is installed, or the image processing apparatus 1000 is the terminal 10 or the server 20.

According to some embodiments, a computer device is further provided and includes a memory and a processor. The memory stores a computer program. The processor implements operations in the above method embodiments when executing the computer program.

Figure 15:
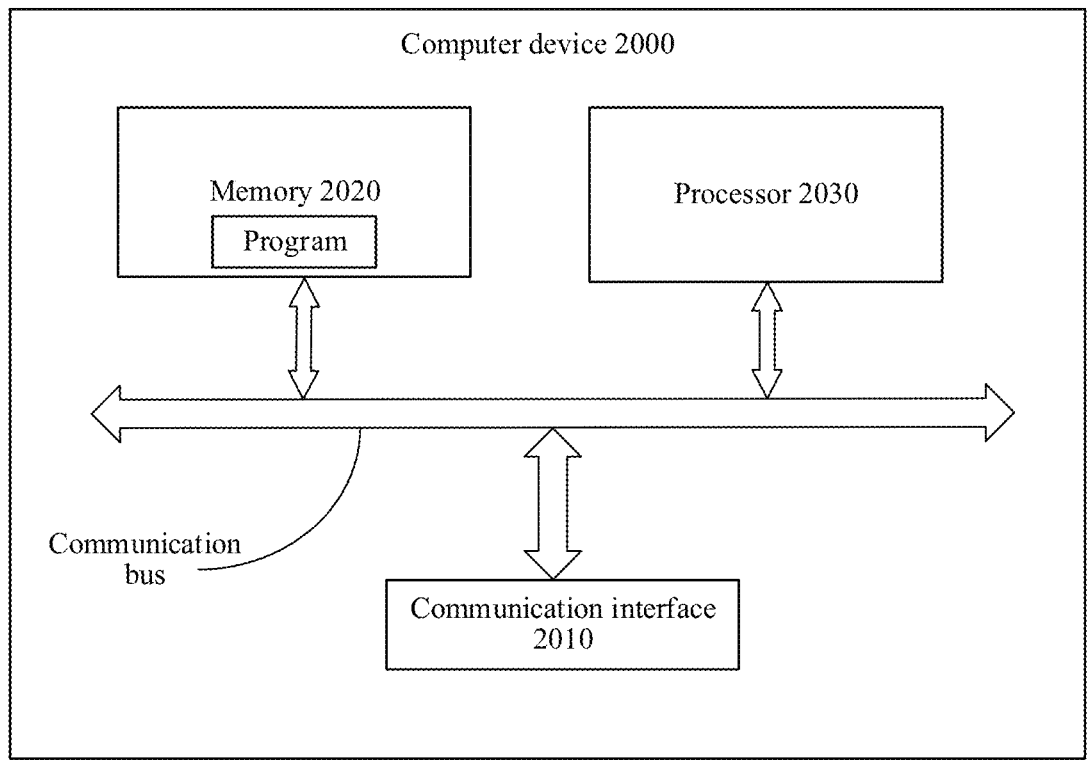
FIG. 15 is a schematic structural diagram of a computer device according to some embodiments.

FIG. 15 is a schematic diagram of a computer device according to some embodiments. The computer device may be the terminal 10 or the server 20 as shown in FIG. 2. As shown in FIG. 15, the computer device 1200 may include: a communication interface 2010, a memory 2020, a processor 2030 and a communication bus 2040. The communication interface 2010, the memory 2020, and the processor 2030 communicate with each other by using the communication bus 2040. The communication interface 2010 is configured to implement data communication between the apparatus 1000 and an external device. The memory 2020 may be configured to store a software program and module, and the processor 2030 runs the software program and module stored in the memory 2020, such as, a software program for a particular operation in the above method embodiments.

In some embodiments, the processor 2030 may call the software program and module stored in the memory 2020 to perform the following operations: encoding a current frame image to obtain an initial encoded image, and obtaining an encoding parameter; and recoding the current frame image in a case that it is determined according to the encoding parameter that the current frame image needs to be recoded, to obtain a target encoded image, a data volume of the target encoded image being less than a data volume of an initial encoded image.

Some embodiments further provide a computer-readable storage medium, which is configured to store a computer program. The computer-readable storage medium may be applied to a computer device, and the computer program enables the computer device to execute a particular process in the image processing method in some embodiments. Details are not described herein again for brevity.

Some embodiments further provide a computer program product, and the computer program product includes a computer instruction stored in a computer-readable storage medium. A processor of a computer device reads the computer instruction from a computer-readable storage medium, and the processor executes the computer instruction, so that the computer device executes a particular process in the image processing method provided by some embodiments. Details are not described herein again for brevity.

Some embodiments further provide a computer program, and the computer program includes a computer instruction, which is stored in a computer-readable storage medium. A processor of a computer device reads the computer instruction from a computer-readable storage medium, and the processor executes the computer instruction, so that the computer device executes a particular process in the image processing method provided by some embodiments. Details are not described herein again for brevity.

It is to be understood that the processor in some embodiments may be an integrated circuit chip, and has a signal processing capability. In an implementation process, operations of the above method embodiments may be implemented by using a hardware integrated logic circuit in the processor or instructions in a form of software. The above processor may be a general purpose processor, a digital signal processor (DSP), an application specific integrated circuit (ASIC), a field programmable gate array (FPGA), or other programmable logic devices, discrete gate or transistor logic devices, and discrete hardware components. The methods, the operations, and logic block diagrams that are disclosed in some embodiments can be implemented or performed. The general purpose processor may be a microprocessor, or the processor may be any conventional processor or the like. The operations of the methods disclosed in some embodiments may be directly embodied as being executed by a hardware decoding processor, or may be performed and completed by using a combination of hardware and software modules in the decoding processor. The software module may be located in a storage medium that is mature in the art, such as a random access memory, a flash memory, a read-only memory, a programmable read-only memory, an electrically erasable programmable memory, or a register. The storage medium is located in the memory. The processor reads information in the memory and completes the operations of the methods in combination with hardware thereof.

It is to be understood that the memory in some embodiments may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms are available, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It is to be understood that the system and method described in the disclosure aim to include but are not limited to these memories and any other suitable types.

It is to be understood that the above memories are illustrative but not limited descriptions, for example, the memory in some embodiments may further be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM) and etc. This is to say, the memory described in some embodiments aims to include but is not limited to these memories and any other suitable types of memory.

A person skilled in the art may notice that the exemplary modules and algorithm operations described with reference to embodiments can be implemented in computer software, electronic hardware, or a combination of computer software and electronic hardware. Whether these functions are implemented in hardware or software depends on the specific application and design constraints of the technical solution. A person skilled in the art may use different methods to implement the described functions for each specific application, but such implementation may not be considered beyond the scope of the disclosure.

A person skilled in the art may clearly understand that, for simple and clear description, for specific work processes of the above described system, apparatus, and module, reference may be made to corresponding process in the above method embodiments, and details are not described herein again. In some embodiments, it is to be understood that the disclosed system, apparatus, and method may be implemented in other manners. For example, the above described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network modules. Some or all of the modules may be selected according to actual needs to achieve the objectives of the solutions of some embodiments. In addition, functional modules in some embodiments may be integrated into one processing module, or each of the modules may exist alone physically, or two or more modules are integrated into one module.

If implemented in the form of software functional units and sold or used as an independent product, the functions may be stored in a computer-readable storage medium. Based on such an understanding, the technical solutions, or the part contributing to the related technology, or some of the technical solutions may be implemented in a form of a software product. The computer software product is stored in a storage medium and includes several instructions for instructing a computer device (which may be a personal computer, or the server 20) to perform all or some of the operations of the methods described in some embodiments. The above storage medium includes various media that may store program code, such as a USB flash drive, a removable hard disk, a ROM, a RAM, a magnetic disk, and an optical disc.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. An image processing method, performed by a computer device, comprising:
    encoding a current frame image to obtain an initial encoded image, and obtaining an encoding parameter, the encoding parameter comprising: a parameter indicating whether a scene switch exists in the current frame image, an image size, a current encoding frame rate and a current encoding bit rate;
    determining a size threshold according to the current encoding frame rate and the current encoding bit rate;
    determining, based on the scene switch existing in the current frame image and the image size being greater than the size threshold, that the current frame image needs to be recoded; and
    recoding the current frame image based on the determination that the current frame image needs to be recoded to obtain a target encoded image,
    wherein
    a data volume of the target encoded image is less than the data volume of the initial encoded image.

2. The image processing method according to claim 1, further comprising:
    determining, based on the current frame image being an instantaneous decoding refresh (IDR) frame, the encoding parameter of the IDR frame as a reference encoding parameter, and transmitting the IDR frame.

3. The image processing method according to claim 1, further comprising:
determining the target encoded image as an IDR frame, and transmitting the IDR frame.

4. The image processing method according to claim 1, wherein the encoding parameter is a ratio of an intra prediction pixel, and
wherein the image processing method further comprises:
determining, based on the ratio of the intra prediction pixel being less than or equal to a preset ratio, that the scene switch does not exist in the current frame image.

5. The image processing method according to claim 1, wherein the encoding parameter is a ratio of an intra prediction pixel, and
wherein the image processing method further comprises:
determining, based on the ratio of the intra prediction pixel being greater than a preset ratio, that the scene switch exists in the current frame image.

6. The image processing method according to claim 5, further comprising:
determining, based on no scene switch existing in the current frame image, that the current frame image does not need to be recoded; or,
determining, based on the scene switch existing in the current frame image and the image size being less than the size threshold, that the current frame image does not need to be recoded.

7. The image processing method according to claim 1, wherein the encoding parameter further comprises an average quantization parameter, and
wherein the recoding comprises:
adjusting the average quantization parameter according to a first adjustment value based on the average quantization parameter being greater than a reference average quantization parameter, the reference average quantization parameter being the average quantization parameter of an IDR frame before the current frame image;
adjusting the average quantization parameter according to a second adjustment value based on the average quantization parameter being less than the reference average quantization parameter, the second adjustment value being greater than the first adjustment value; and
recoding the current frame image according to the adjusted average quantization parameter to obtain the target encoded image.

8. The image processing method according to claim 1, wherein the encoding parameter comprises an image size and an average quantization parameter, and
wherein the recoding comprises:
adjusting the average quantization parameter according to a first adjustment value based on the image size being less than a reference image size, the reference image size being the image size of an IDR frame before the current frame image;
adjusting the average quantization parameter according to a second adjustment value based on the image size being greater than the reference image size, the second adjustment value being greater than the first adjustment value; and
recoding the current frame image according to the adjusted average quantization parameter to obtain the target encoded image.

9. The image processing method according to claim 1, wherein the encoding parameter comprises an average quantization parameter and an image size, and
wherein the recoding comprises:
adjusting the average quantization parameter according to a first adjustment value based on the average quantization parameter being greater than a reference average quantization parameter and the image size being less than a reference image size, the reference average quantization parameter being the average quantization parameter of an IDR frame before the current frame image, and the reference image size being determined according to the image size of the IDR frame before the current frame image;
adjusting the average quantization parameter according to a second adjustment value based on the average quantization parameter being less than the reference average quantization parameter; or adjusting the average quantization parameter according to the second adjustment value based on the average quantization parameter being greater than the reference average quantization parameter and the image size being greater than the reference image size, the second adjustment value being greater than the first adjustment value; and
recoding the current frame image according to the adjusted average quantization parameter to obtain the target encoded image.

10. The image processing method according to claim 1, further comprising:
transmitting, through a cloud gaming client, a capability request to a terminal, the capability request being a request for encoding and decoding capability information of the terminal;
receiving the encoding and decoding capability information transmitted by the terminal through the cloud gaming client; and
determining a target encoding and decoding configuration and a target encoding and decoding policy according to the encoding and decoding capability information, a game run by the terminal, and network communication information; wherein
the encoding the current frame image comprises:
encoding the current frame image according to the target encoding and decoding configuration and the target encoding and decoding policy.

11. An image processing apparatus, comprising:
at least one memory configured to store program code; and
at least one processor configured to read the program code and operate as instructed by the program code, the program code comprising:
first encoding code configured to cause the at least one processor to:
encode a current frame image to obtain an initial encoded image, and obtain an encoding parameter, the encoding parameter comprises: a parameter for indicating whether a scene switch exists in the current frame image, an image size, a current encoding frame rate and a current encoding bit rate,
determine a size threshold according to the current encoding frame rate and the current encoding bit rate, and
determine, based on that the scene switch existing in the current frame image and the image size being greater than the size threshold, that the current frame image needs to be recoded; and second encoding code configured to cause the at least one processor to recode the current frame image based on the determination that the current frame image needs to be recoded to obtain a target encoded image,
wherein a data volume of the target encoded image is less than the data volume of the initial encoded image.

12. The image processing apparatus according to claim 11, wherein the program code further comprises:
first determining code configured to cause the at least one processor to determine, based on the current frame image being an instantaneous decoding refresh (IDR) frame, the encoding parameter of the IDR frame as a reference encoding parameter, and transmitting the IDR frame.

13. The image processing apparatus according to claim 11, wherein the program code further comprises:
second determining code configured to cause the at least one processor to determine the target encoded image as an IDR frame, and transmitting the IDR frame.

14. The image processing apparatus according to claim 12, wherein the encoding parameter is a ratio of an intra prediction pixel, and
wherein the first determining code is further configured to cause the at least one processor to:
determine, based on the ratio of the intra prediction pixel being less than or equal to a preset ratio, that a scene switch exists in the current frame image.

15. The image processing apparatus according to claim 12, wherein the encoding parameter is a ratio of an intra prediction pixel, and
wherein the first determining code is further configured to cause the at least one processor to:
determine, based on the ratio of the intra prediction pixel being greater than a preset ratio, that a scene switch exists in the current frame image.

16. The image processing apparatus according to claim 15, wherein the first determining code is further configured to cause the at least one processor to:
determine, based on no scene switch existing in the current frame image, that the current frame image does not need to be recoded; or,
determine, based on the scene switch existing in the current frame image and the image size is-being less than the size threshold, that the current frame image does not need to be recoded.

17. The image processing apparatus according to claim 11, wherein the encoding parameter further comprises an average quantization parameter, and
wherein the second encoding code is further configured to cause the at least one processor to:
adjust the average quantization parameter according to a first adjustment value based on the average quantization parameter being greater than a reference average quantization parameter, the reference average quantization parameter being the average quantization parameter of an IDR frame before the current frame image,
adjust the average quantization parameter according to a second adjustment value based on the average quantization parameter being less than the reference average quantization parameter, the second adjustment value being greater than the first adjustment value, and
recode the current frame image according to the adjusted average quantization parameter to obtain the target encoded image.

18. The image processing apparatus according to claim 11, wherein the encoding parameter comprises an image size and an average quantization parameter, and
wherein the second encoding code is further configured to cause the at least one processor to:
adjust the average quantization parameter according to a first adjustment value based on the image size being less than a reference image size, the reference image size being the image size of an IDR frame before the current frame image,
adjust the average quantization parameter according to a second adjustment value based on the image size being greater than the reference image size, the second adjustment value being greater than the first adjustment value, and
recode the current frame image according to the adjusted average quantization parameter to obtain the target encoded image.

19. The image processing apparatus according to claim 11, wherein the encoding parameter comprises an average quantization parameter and an image size, and
wherein the second encoding code is further configured to cause the at least one processor to:
adjust the average quantization parameter according to a first adjustment value based on the average quantization parameter being greater than a reference average quantization parameter and the image size being less than a reference image size, the reference average quantization parameter being the average quantization parameter of an IDR frame before the current frame image, and the reference image size being determined according to the image size of the IDR frame before the current frame image,
adjust the average quantization parameter according to a second adjustment value based on the average quantization parameter being less than the reference average quantization parameter; or adjusting the average quantization parameter according to the second adjustment value based on the average quantization parameter being greater than the reference average quantization parameter and the image size being greater than the reference image size, the second adjustment value being greater than the first adjustment value, and
recode the current frame image according to the adjusted average quantization parameter to obtain the target encoded image.

20. A non-transitory computer-readable storage medium storing computer code that when executed by at least one processor causes the at least one processor to:
encode a current frame image to obtain an initial encoded image, and obtaining an encoding parameter, the encoding parameter comprising: a parameter indicating whether a scene switch exists in the current frame image, an image size, a current encoding frame rate and a current encoding bit rate;
determine a size threshold according to the current encoding frame rate and the current encoding bit rate;
determine, based on the scene switch existing in the current frame image and the image size being greater than the size threshold, that the current frame image needs to be recode; and
recode the current frame image based on the determination that the current frame image needs to be recoded to obtain a target encoded image, wherein a data volume of the target encoded image is less than the data volume of the initial encoded image.

* * * * *